(12) United States Patent
Perna et al.

(10) Patent No.: US 10,484,584 B2
(45) Date of Patent: Nov. 19, 2019

(54) SYSTEM AND METHOD FOR MOBILE DEVICE BIOMETRIC ADD-ON

(71) Applicant: Princeton Identity, Inc., Hamilton, NJ (US)

(72) Inventors: Steven N. Perna, Lawrenceville, NJ (US); Barry E. Mapen, Stonington, CT (US); David Alan Ackerman, Hopewell, NJ (US)

(73) Assignee: Princeton Identity, Inc., Hamilton, NJ (US)

( * ) Notice: Subject to any disclaimer, the term of this patent is extended or adjusted under 35 U.S.C. 154(b) by 0 days.

(21) Appl. No.: 15/531,922

(22) PCT Filed: Nov. 17, 2015

(86) PCT No.: PCT/US2015/061024
§ 371 (c)(1),
(2) Date: May 31, 2017

(87) PCT Pub. No.: WO2016/089592
PCT Pub. Date: Jun. 9, 2016

(65) Prior Publication Data
US 2017/0347000 A1    Nov. 30, 2017

Related U.S. Application Data

(60) Provisional application No. 62/086,867, filed on Dec. 3, 2014.

(51) Int. Cl.
*H04N 5/225* (2006.01)
*G06K 9/00* (2006.01)
(Continued)

(52) U.S. Cl.
CPC ....... *H04N 5/2254* (2013.01); *G02B 13/0065* (2013.01); *G06F 21/32* (2013.01);
(Continued)

(58) Field of Classification Search
CPC ............... H04N 5/2254; H04N 5/2256; H04N 5/23219; G02B 13/0065
See application file for complete search history.

(56) References Cited

U.S. PATENT DOCUMENTS

| 3,852,592 A | 12/1974 | Scoville et al. |
| 3,993,888 A | 11/1976 | Fellman |

(Continued)

FOREIGN PATENT DOCUMENTS

| CN | 102708357 A | 10/2012 |
| CN | 103048848 A | 4/2013 |

(Continued)

OTHER PUBLICATIONS

International Search Report dated Mar. 31, 2016, issued in connection with International Application No. PCT/US2015/061024 (2 pages).

(Continued)

*Primary Examiner* — Abdelaaziz Tissire
(74) *Attorney, Agent, or Firm* — McCarter & English LLP

(57) ABSTRACT

A method of operating a device to obtain biometric information from a subject includes the step of orienting a device relative to a subject such that a first portion of the device faces the subject, wherein a second portion of the mobile device comprises a camera, the first and second portions being different sides of the device. The method may further includes the steps of operating an optical assembly that is movably coupled to the device, the optical assembly being configured to modify an optical pathway of at least the camera in a direction of the subject and acquiring imaging data of the subject using the camera. The method may further includes the steps of analyzing the acquired imaging data to generate biometric information corresponding to the (Continued)

subject and generating a report using the biometric information.

20 Claims, 11 Drawing Sheets

(51) Int. Cl.
*G02B 13/00* (2006.01)
*H04M 1/02* (2006.01)
*H04N 5/232* (2006.01)
*G06F 21/32* (2013.01)
*G02B 5/122* (2006.01)
*H04L 29/06* (2006.01)
*H04W 12/06* (2009.01)
*H04M 1/67* (2006.01)

(52) U.S. Cl.
CPC ..... *G06K 9/00604* (2013.01); *G06K 9/00617* (2013.01); *H04M 1/0264* (2013.01); *H04N 5/2256* (2013.01); *H04N 5/23219* (2013.01); *G02B 5/122* (2013.01); *H04L 63/083* (2013.01); *H04M 1/0254* (2013.01); *H04M 1/67* (2013.01); *H04M 2250/52* (2013.01); *H04W 12/06* (2013.01)

(56) References Cited

U.S. PATENT DOCUMENTS

| | | | |
|---|---|---|---|
| 4,109,237 A | 8/1978 | Hill | |
| 4,641,349 A | 2/1987 | Flom et al. | |
| 5,291,560 A | 3/1994 | Daugman | |
| 5,337,104 A * | 8/1994 | Smith | G03B 15/05 396/199 |
| 5,481,622 A | 1/1996 | Gerhardt et al. | |
| 5,572,596 A | 11/1996 | Wildes et al. | |
| 5,835,616 A | 11/1998 | Lobo et al. | |
| 5,861,940 A | 1/1999 | Robinson et al. | |
| 5,933,515 A | 8/1999 | Pu et al. | |
| 5,953,440 A | 9/1999 | Zhang et al. | |
| 5,966,197 A | 10/1999 | Yee | |
| 5,987,459 A | 11/1999 | Swanson et al. | |
| 6,055,322 A | 4/2000 | Salganicoff et al. | |
| 6,081,607 A | 6/2000 | Mori et al. | |
| 6,119,096 A | 9/2000 | Mann et al. | |
| 6,144,754 A | 11/2000 | Okano et al. | |
| 6,204,858 B1 | 3/2001 | Gupta | |
| 6,229,907 B1 | 5/2001 | Okano et al. | |
| 6,247,813 B1 | 6/2001 | Kim et al. | |
| 6,252,976 B1 | 6/2001 | Schildkraut et al. | |
| 6,301,370 B1 | 10/2001 | Steffens et al. | |
| 6,307,954 B1 | 10/2001 | Suzaki | |
| 6,320,610 B1 | 11/2001 | Van Sant et al. | |
| 6,421,462 B1 | 7/2002 | Christian et al. | |
| 6,424,727 B1 | 7/2002 | Musgrave et al. | |
| 6,433,326 B1 | 8/2002 | Levine et al. | |
| 6,525,303 B1 | 2/2003 | Gladnick | |
| 6,526,160 B1 | 2/2003 | Ito | |
| 6,542,624 B1 | 4/2003 | Oda | |
| 6,549,644 B1 | 4/2003 | Yamamoto | |
| 6,614,919 B1 | 9/2003 | Suzaki et al. | |
| 6,714,665 B1 | 3/2004 | Hanna et al. | |
| 6,765,581 B2 | 7/2004 | Cheng | |
| 6,836,554 B1 | 12/2004 | Bolle et al. | |
| 6,850,252 B1 | 2/2005 | Hoffberg | |
| 6,895,103 B2 | 5/2005 | Chen et al. | |
| 6,912,298 B1 | 6/2005 | Wilensky | |
| 6,977,989 B2 | 12/2005 | Bothe et al. | |
| 7,015,955 B2 | 3/2006 | Funston et al. | |
| 7,095,901 B2 | 8/2006 | Lee et al. | |
| 7,099,495 B2 | 8/2006 | Kodno et al. | |
| 7,118,042 B2 | 10/2006 | Moore et al. | |
| 7,130,453 B2 | 10/2006 | Kondo et al. | |
| 7,146,027 B2 | 12/2006 | Kim et al. | |
| 7,295,686 B2 | 11/2007 | Wu | |
| 7,310,443 B1 | 12/2007 | Kris et al. | |
| 7,380,938 B2 | 6/2008 | Chmielewski, Jr. et al. | |
| 7,428,320 B2 | 9/2008 | Northcott et al. | |
| 7,466,308 B2 | 12/2008 | Dehlin | |
| 7,466,847 B2 | 12/2008 | Komura | |
| 7,542,628 B2 | 6/2009 | Lolacono et al. | |
| 7,574,021 B2 | 8/2009 | Matey | |
| 7,583,823 B2 | 9/2009 | Jones et al. | |
| 7,599,524 B2 | 10/2009 | Camus et al. | |
| 7,627,147 B2 | 12/2009 | Lolacono et al. | |
| 7,634,114 B2 | 12/2009 | Zappia | |
| 7,657,127 B2 | 2/2010 | Lolacono et al. | |
| 7,751,598 B2 | 7/2010 | Matey et al. | |
| 7,925,059 B2 | 4/2011 | Hoyos et al. | |
| 8,050,463 B2 | 11/2011 | Hamza | |
| 8,170,293 B2 | 5/2012 | Tosa et al. | |
| 8,189,879 B2 | 5/2012 | Cambier | |
| 8,195,576 B1 | 6/2012 | Grigg et al. | |
| 8,200,980 B1 | 6/2012 | Robinson et al. | |
| 8,317,325 B2 | 11/2012 | Raguin et al. | |
| 8,374,404 B2 | 2/2013 | Williams et al. | |
| 8,553,948 B2 | 10/2013 | Hanna | |
| 8,603,165 B2 | 12/2013 | Park | |
| 8,639,058 B2 | 1/2014 | Bergen et al. | |
| 8,682,073 B2 | 3/2014 | Bergen | |
| 8,755,607 B2 | 6/2014 | Bergen et al. | |
| 8,854,446 B2 | 10/2014 | Bergen et al. | |
| 8,934,005 B2 | 1/2015 | De Bruijn | |
| 9,100,825 B2 | 8/2015 | Schultz et al. | |
| 9,131,141 B2 | 9/2015 | Tinker et al. | |
| 9,195,890 B2 | 11/2015 | Bergen | |
| 9,514,365 B2 | 12/2016 | Tinker et al. | |
| 9,665,772 B2 | 5/2017 | Bergen | |
| 9,836,647 B2 | 12/2017 | Perna et al. | |
| 9,836,648 B2 | 12/2017 | Perna et al. | |
| 10,025,982 B2 | 7/2018 | Perna et al. | |
| 2002/0080141 A1 | 6/2002 | Imai et al. | |
| 2002/0118864 A1 | 8/2002 | Kondo et al. | |
| 2002/0150280 A1 | 10/2002 | Li | |
| 2002/0154794 A1 | 10/2002 | Cho | |
| 2002/0164054 A1 | 11/2002 | McCartney et al. | |
| 2002/0180586 A1 | 12/2002 | Kitson et al. | |
| 2003/0046553 A1 | 3/2003 | Angelo | |
| 2003/0103652 A1 | 6/2003 | Lee et al. | |
| 2003/0123711 A1 | 7/2003 | Kim et al. | |
| 2003/0169334 A1 | 9/2003 | Braithwaite et al. | |
| 2003/0174211 A1 | 9/2003 | Imaoka et al. | |
| 2004/0037452 A1 | 2/2004 | Shin | |
| 2004/0088584 A1 | 5/2004 | Shachar et al. | |
| 2004/0146187 A1 | 7/2004 | Jeng | |
| 2004/0170304 A1 | 9/2004 | Haven | |
| 2004/0213437 A1 | 10/2004 | Howard et al. | |
| 2004/0236549 A1 | 11/2004 | Dalton | |
| 2005/0047655 A1 | 3/2005 | Luo et al. | |
| 2005/0063582 A1 | 3/2005 | Park et al. | |
| 2005/0084179 A1 | 4/2005 | Hanna et al. | |
| 2005/0088200 A1 | 4/2005 | Takekuma et al. | |
| 2005/0210267 A1 | 9/2005 | Sugano et al. | |
| 2005/0270386 A1 | 12/2005 | Saitoh et al. | |
| 2006/0008125 A1 | 1/2006 | Lauper et al. | |
| 2006/0028617 A1 | 2/2006 | Matsumura et al. | |
| 2006/0098097 A1 | 5/2006 | Wach et al. | |
| 2006/0105806 A1 | 5/2006 | Vance et al. | |
| 2006/0120570 A1 | 6/2006 | Azuma et al. | |
| 2006/0140454 A1 | 6/2006 | Northcott et al. | |
| 2006/0150928 A1 | 7/2006 | Lehmann et al. | |
| 2006/0184243 A1 | 8/2006 | Yilmaz | |
| 2006/0202036 A1 | 9/2006 | Wang et al. | |
| 2006/0210123 A1 | 9/2006 | Kondo et al. | |
| 2006/0222212 A1 | 10/2006 | Du et al. | |
| 2006/0245623 A1 | 11/2006 | Loiacono et al. | |
| 2006/0274918 A1 | 12/2006 | Amantea et al. | |
| 2007/0014439 A1 | 1/2007 | Ando | |
| 2007/0025598 A1 | 2/2007 | Kobayashi et al. | |
| 2007/0036397 A1 | 2/2007 | Hamza | |
| 2007/0047770 A1 | 3/2007 | Swope et al. | |
| 2007/0116454 A1 * | 5/2007 | Tsai | G03B 17/17 396/287 |

(56) References Cited

U.S. PATENT DOCUMENTS

| | | |
|---|---|---|
| 2007/0140531 A1 | 6/2007 | Hamza |
| 2007/0160266 A1 | 7/2007 | Jones et al. |
| 2007/0189582 A1 | 8/2007 | Hamza et al. |
| 2007/0198850 A1 | 8/2007 | Martin et al. |
| 2007/0201728 A1 | 8/2007 | Monro |
| 2007/0206935 A1 | 9/2007 | Ono |
| 2007/0236567 A1 | 10/2007 | Pillman et al. |
| 2007/0285537 A1 | 12/2007 | Dwinell et al. |
| 2008/0049185 A1 | 2/2008 | Huffman et al. |
| 2008/0069411 A1 | 3/2008 | Friedman et al. |
| 2008/0121721 A1* | 5/2008 | Chen .................. G06K 7/10831 235/462.45 |
| 2008/0180544 A1 | 7/2008 | Drader et al. |
| 2008/0187174 A1 | 8/2008 | Metaxas et al. |
| 2008/0219515 A1 | 9/2008 | Namgoong |
| 2008/0271116 A1 | 10/2008 | Robinson et al. |
| 2008/0273112 A1* | 11/2008 | Sladen ................ H04M 1/0218 348/370 |
| 2009/0041309 A1 | 2/2009 | Kim |
| 2009/0208064 A1 | 8/2009 | Cambier |
| 2009/0216606 A1 | 8/2009 | Coffman et al. |
| 2009/0220126 A1 | 9/2009 | Claret-Tournier et al. |
| 2009/0232418 A1 | 9/2009 | Lolacono et al. |
| 2009/0278922 A1* | 11/2009 | Tinker ................. G06K 9/0061 348/78 |
| 2010/0026853 A1 | 2/2010 | Mokhnatyuk |
| 2010/0034529 A1 | 2/2010 | Jelinek |
| 2010/0046808 A1 | 2/2010 | Connell et al. |
| 2010/0063880 A1 | 3/2010 | Atsmon et al. |
| 2010/0082398 A1 | 4/2010 | Davis et al. |
| 2010/0142938 A1* | 6/2010 | Zhang .................... G02B 7/182 396/384 |
| 2010/0176802 A1 | 7/2010 | Huguet |
| 2010/0278394 A1 | 11/2010 | Raguin et al. |
| 2010/0287053 A1 | 11/2010 | Ganong et al. |
| 2010/0290668 A1 | 11/2010 | Friedman et al. |
| 2010/0301113 A1 | 12/2010 | Bohn et al. |
| 2010/0310133 A1 | 12/2010 | Mason et al. |
| 2010/0328420 A1* | 12/2010 | Roman ................ H04N 5/2251 348/14.08 |
| 2011/0007205 A1* | 1/2011 | Lee ..................... H04N 5/2252 348/369 |
| 2011/0043683 A1* | 2/2011 | Beach ................ G02B 13/0065 348/373 |
| 2011/0075893 A1 | 3/2011 | Connel, II et al. |
| 2011/0081946 A1* | 4/2011 | Singh .................. H04M 1/0264 455/556.1 |
| 2011/0134268 A1 | 6/2011 | MacDonald |
| 2011/0142297 A1 | 6/2011 | Yu et al. |
| 2011/0187878 A1 | 8/2011 | Mor et al. |
| 2011/0317991 A1 | 12/2011 | Tsai |
| 2012/0086645 A1 | 4/2012 | Zheng et al. |
| 2012/0154536 A1 | 6/2012 | Stoker et al. |
| 2012/0155716 A1* | 6/2012 | Kim .................... G06K 9/00013 382/115 |
| 2012/0163783 A1 | 6/2012 | Braithwaite et al. |
| 2012/0243729 A1 | 9/2012 | Pasquero |
| 2012/0293642 A1 | 11/2012 | Berini et al. |
| 2013/0014153 A1 | 1/2013 | Bhatia et al. |
| 2013/0044199 A1 | 2/2013 | Nanu et al. |
| 2013/0051631 A1 | 2/2013 | Hanna |
| 2013/0081119 A1 | 3/2013 | Sampas |
| 2013/0083185 A1* | 4/2013 | Coleman, III ............ A61B 3/12 348/78 |
| 2013/0089240 A1 | 4/2013 | Northcott et al. |
| 2013/0091520 A1 | 4/2013 | Chen |
| 2013/0147603 A1 | 6/2013 | Malhas et al. |
| 2013/0150120 A1* | 6/2013 | Wu ...................... G06F 1/1626 455/556.1 |
| 2013/0162798 A1 | 6/2013 | Hanna et al. |
| 2013/0188943 A1* | 7/2013 | Wu ...................... G03B 17/17 396/419 |
| 2013/0194407 A1 | 8/2013 | Kim |
| 2013/0215228 A1 | 8/2013 | Stoker et al. |
| 2013/0250085 A1 | 9/2013 | MacKinnon |
| 2013/0329115 A1* | 12/2013 | Palmeri .................. A45C 11/00 348/335 |
| 2014/0046772 A1 | 2/2014 | Raman |
| 2014/0055337 A1 | 2/2014 | Karlsson |
| 2014/0059607 A1 | 2/2014 | Upadhyay et al. |
| 2014/0071547 A1 | 3/2014 | O'Neill et al. |
| 2014/0078389 A1* | 3/2014 | Merz .................... H04N 5/2252 348/375 |
| 2014/0161325 A1 | 6/2014 | Bergen |
| 2014/0171150 A1* | 6/2014 | Hurst .................. H04M 1/0264 455/556.1 |
| 2014/0232930 A1* | 8/2014 | Anderson ............ G03B 17/565 348/369 |
| 2014/0327815 A1* | 11/2014 | Auger ................ G06K 7/10712 348/369 |
| 2014/0369575 A1* | 12/2014 | Riopka .............. G06K 9/00046 382/127 |
| 2015/0037935 A1 | 2/2015 | Kim et al. |
| 2015/0098629 A1 | 4/2015 | Perna et al. |
| 2015/0098630 A1 | 4/2015 | Perna et al. |
| 2015/0126245 A1* | 5/2015 | Barkan ................ H04M 1/0254 455/556.1 |
| 2015/0193666 A1 | 7/2015 | Derakhshani et al. |
| 2015/0227790 A1 | 8/2015 | Smits |
| 2015/0286864 A1 | 10/2015 | Gottemukkula et al. |
| 2015/0338915 A1 | 11/2015 | Publicover et al. |
| 2015/0379325 A1 | 12/2015 | Tinker et al. |
| 2016/0012275 A1 | 1/2016 | Bergen |
| 2016/0012292 A1 | 1/2016 | Perna et al. |
| 2016/0014121 A1 | 1/2016 | Perna et al. |
| 2016/0117544 A1 | 4/2016 | Hoyos et al. |
| 2016/0148384 A1 | 5/2016 | Bud et al. |
| 2016/0274660 A1 | 9/2016 | Publicover et al. |
| 2016/0345818 A1 | 12/2016 | Suzuki et al. |
| 2016/0364609 A1 | 12/2016 | Ivanisov et al. |
| 2017/0111568 A1* | 4/2017 | Hsieh .................. H04N 5/2252 |
| 2017/0124314 A1 | 5/2017 | Laumea |
| 2017/0132399 A1 | 5/2017 | Pawluk et al. |
| 2017/0286790 A1 | 10/2017 | Mapen et al. |
| 2017/0286792 A1 | 10/2017 | Ackerman et al. |
| 2017/0323167 A1 | 11/2017 | Mapen et al. |
| 2017/0337439 A1 | 11/2017 | Ackerman et al. |
| 2017/0337440 A1 | 11/2017 | Green et al. |
| 2017/0337441 A1 | 11/2017 | Mapen et al. |
| 2018/0025244 A1 | 1/2018 | Bohl et al. |
| 2018/0165537 A1 | 6/2018 | Ackerman |

FOREIGN PATENT DOCUMENTS

| | | |
|---|---|---|
| CN | 103099624 A | 5/2013 |
| EP | 0821912 A2 | 2/1998 |
| EP | 1324259 A1 | 7/2003 |
| JP | 2007011667 A | 1/2007 |
| JP | 2008-538425 A | 10/2008 |
| JP | 4372321 B2 | 11/2009 |
| KR | 2003-0066512 A | 8/2003 |
| KR | 10-2011-0134848 A | 12/2011 |
| WO | WO-1996/19132 A1 | 6/1996 |
| WO | WO-1997/14873 A1 | 4/1997 |
| WO | WO-1997/21188 A1 | 6/1997 |
| WO | WO-1998/08439 A1 | 3/1998 |
| WO | WO-1999/31183 A1 | 6/1999 |
| WO | WO-2000/39760 A1 | 7/2000 |
| WO | WO-2013/056001 A1 | 4/2013 |
| WO | WO-2014/093227 A1 | 6/2014 |
| WO | WO-2014/100250 A2 | 6/2014 |
| WO | WO-2015/102704 A2 | 7/2015 |
| WO | WO-2017/172695 A1 | 10/2017 |
| WO | WO-2017/173228 A1 | 10/2017 |

OTHER PUBLICATIONS

Written Opinion of the International Searching Authority dated Mar. 31, 2016, issued in connection with International Application No. PCT/US2015/061024 (5 pages).

(56) References Cited

OTHER PUBLICATIONS

Annapoorani et al., Accurate and Fast Iris Segmentation. International Journal of Engineering Science and Technology. 2010;2(6):1492-1499.
Arfken, G., "Mathematical Methods for Physicists," Academic Press, NY 6.sup.th Ed. (2005).
Atos Origin, "UK Passport Service, Biometrics Enrollment Trial." Atos Origin Report (May 2005).
Bertalmio et al., Navier-Stokes, Fluid Dynamics, and Image and Video Inpainting. Proceedings of the 2001 IEEE Computer Society Conferenc on Computer Vision and Pattern Recognition. CVPR 2001, 8 pages, (2001).
Betke, et al., "Preliminary Investigation of Real-time Monitoring of a Driver in City Traffic," IEEE Intelligent Vehicles Syposium, Oct. 3-5, 2000, Dearborn, MI, 563-568.
Boehnen et al., A Multi-Sample Standoff Multimodal Biometric System, Theory, Aoolications and Systems (BTAS), Sep. 23, 2012, pp. 127-134.
Bowyer et al., Image Understanding for Iris Biometrics: A Survey. Computer Vision and Image Understanding. 2008;110:281-307.
Braithwaite, Michael et al., "Application-Specific Biometric Templates," AutoID 2002 Workshop, Tarrytown, NY, pp. 1-10 (2002).
Burt, et al., "The Laplacian Pyramid as a Compact Image Code," IEEE Transactions on Communications, 31(4): 532-540, 1983.
Canadian Offic Action for Application 2,833, 740 dated Jan. 15, 2018.
Office Action dated Oct. 30, 2018, issued in connection with U.S. Appl. No. 15/514,098 (35 pages).
Office Action dated Sep. 26, 2018, issued in connection with U.S. Appl. No. 15/471,131 (15 pages).
Daugman John, "How Iris Recognition Works," IEEE Transactions on Circuits and Systems for Video Teohnology, vol. 14, No. 1 (Jan. 2004).
Daugman, J., "High confidence visual recognition of persons by a test of statistical independence", IEEE Transactions on Pattern Analysis and Machine Intelligence, 15 (11), pp. 1148-1161 (1993).
Daugman, J., "Recognizing Persons by Their Iris Patterns," in Biometrics: Personal Indentification in a Networked Society, A.K. Jain, et al., eds. Kluwer Academic Pub. 1999.
Daugman, John et al., "Iris recognition border-crossing system in the UAE," International Airport Review, Issue 2 (2004).
Daugman, John."How Iris Recognition Works".Jun. 13, 2003. IEEE Transactions on Circuits and Systems for Video technology, vol. 14, No. 1.
Daugman, The Importance of Being Random: Statistical Principles of Iris Recognition. Pattern Recognition. Pre-publication version. 13 pages, Dec. 21, 2001.
DellaVecchia, et al., "Methodology and apparatus for using the human iris as a robust biometric," Ophthalmic Technologies VIII, SPIE Biomedical Optics Society, Photonics West Conference, San Jose, CA Jan. 24, 1998.
Du et al., Analysis of Partial Iris Recognition Using a 1-D Approach. Proceedings, IEEE International Conference on Acoustics, Speech, and Signal Processing. Mar. 18-23, 2005;2;961-964.
European Office Action for Application 12719332.4 dated Jan. 29, 2018.
European Search Report for Apllication 14876521.7 dated Oct. 19, 2017.
Fan, et al., "An Efficient Automatic Iris Image Acquisition and Preprocessing System," Proceedings of the 2006 IEEE International Conference on Mechatronics and Automation, pp. 1779-1784 (6 pages).
Final Office Action dated Aug. 18, 2016 from U.S. Appl. No. 14/858,715, filed Sep. 18, 2015 (6 pages).
Final Office Action dated Aug. 4, 2016 from U.S. Appl. No. 14/509,366, filed Oct. 8, 2014 (24 pages).
Final Office Action dated Mar. 21, 2017 from U.S. Appl. No. 14/863,936, filed Sep. 24, 2015 (17 pages).
Final Office Action dated Mar. 22, 2017 from U.S. Appl. No. 14/863,950, filed Sep. 24, 2015 (16 pages).
Final Office Action dated Mar. 22, 2017 from U.S. Appl. No. 14/863,960, filed Sep. 24, 2015 (21 pages).
Final Office Action for U.S. Appl. No. 10/818,307, dated Jan. 21, 2009, 28 pages.
Final Office Action for U.S. Appl. No. 10/818,307, dated Jan. 30, 2008, 19 pages.
Final Office Action for U.S. Appl. No. 11/377,042, dated Nov. 14, 2008, 20 pages.
Final Office Action for U.S. Appl. No. 11/510,197, dated May 5, 2009, 16 pages.
Final Office Action for U.S. Appl. No. 12/464,369, dated Aug. 5, 2014, 22 pages.
Final Office Action for U.S. Appl. No. 12/464,369, dated Oct. 3, 2012, 27 pages.
Final Office Action for U.S. Appl. No. 12/576,644, dated Oct. 13, 2010, 11 pages.
Final Office Action for U.S. Appl. No. 14/100,615, dated Sep. 1, 2015, 22 pages.
Final Office Action for U.S. Appl. No. 14/509,356, dated Sep. 28, 2016, 20 pages.
Final Office Action for U.S. Appl. No. 14/509,366, dated Aug. 4, 2016, 29 pages.
Final Office Action for U.S. Appl. No. 14/846,090, dated Jun. 15, 2016, 17 pages.
Final Office Action for U.S. Appl. No. 14/858,715, dated Aug. 18, 2016, 29 pages.
Final Office Action for U.S. Appl. No. 14/858,715, dated Aug. 18, 2016, 6 pages.
Final Office Action for U.S. Appl. No. 14/863,936, dated Mar. 21, 2017, 17 pages.
Final Office Action for U.S. Appl. No. 14/863,950, dated Mar. 22, 2017, 16 pages.
Final Office Action for U.S. Appl. No. 14/863,960, dated Mar. 22, 2017, 21 pages.
First Japanese Office Action for Application 2015-545911 dated Feb. 26, 2018 ( with English translation).
FIT Validation Studies, http://www.pmifit.com/validation.htm, Mar. 2, 2004.
Google Scholar Search—"Rida Hadma" pp. 1 of 2.
Haro, et al., "Detecting and Tracking Eyes by Using Their Physiological Properties, Dynamics and Appearance," CVPR 2000, 163-168.
Hutchinson, et al., "Human-Computer Interaction Using Eye-Gaze Input," IEEE Transaction on Systems, Man and Cybernetics, 19(6): 1527-1534, 1989.
International Biometrics Group, "Independent Testing of IRIS Recognition Technology, Final Report," Study Commissioned by the US Department of Homeland Security (May 2005).
International Preliminary Report on Patentability for Application No. PCT/US2015/051863, dated Mar. 28, 2017, 6 pages.
International Search Report and Written Opinion for Application No. PCT/US17/13110, dated May 18, 2017, 12 pages.
International Search Report and Written Opinion for Application No. PCT/US17/24444, dated Jun. 19, 2017, 9 pages.
International Search Report and Written Opinion for Application No. PCT/US2013/073887, dated Mar. 20, 2014, 11 pages.
International Search Report and Written Opinion for Application No. PCT/US2017/025303, dated Jun. 16, 2017, 11 pages.
International Search Report and Written Opinion for PCT/US2017/24444 dated Jun. 19, 2017 pp. 1-15.
International Search Report and Written Opinion for PCT/US2018/042807, dated Sep. 27, 2018, pp. 1-19.
International Search Report and Written Opinionf for PCT/US2017/025303 dated Jun. 16, 2017.
International Search Report for Application No. PCT/US2015/051863, dated Dec. 10, 2015, 1 page.
International Search Report for Application No. PCT/US2017/065793, dated Feb. 16, 2018, 3 pages.
International Search Report of the International Searching Authority dated Jun. 28, 2018, issued in connection with International Application No. PCT/US2018/025895 (3 pages).

(56) References Cited

OTHER PUBLICATIONS

Iwai, Daisuke, Shoichiro Mihara, and Kosuke Sato. "Extended depth-of-field projector by fast focal sweep projection." IEEE transactions on visualization and computer graphics 21.4 (2015): 462-470.
Jacob, R., "The Use of Eye Movements in Human-Computer Interaction Techniques: What you Look At is What you Get," ACM Trans. Info.Sys., 9(3):152-169.
Japanese Office Action for Application No. 2015-545911, dated Feb. 20, 2018, 6 pages.
Li, Zexi, "An Iris Recognition Algorithm Based on Coarse and Fine Location," 2017 IEEE 2nd International Conference on Big Data Analysis, pp. 744-747 (4 pages).
Ma et al., "Efficient Iris Recognition by Characterizing Key Local Variations", IEEE Transactions on Image Processing, vol. 13, No. 6, Jun. 2004, 12 pages.
Ma., et al. "Iris Recognition Using Circular Symmetric Filters," Pattern Recognition, 2002, Proceedings 16th International Conference on vol. 2 IEEE, 2002 (4 pages).
Ma., et al., "Iris Recognition Based on Multichannel Gabor Filtering" ACCV2002: The 5th Asian Conference on Computer Vision, Jan. 23-25, 2002, Melbourne, Australia (5 pages).
Mansfield, Tony et al., "Biometric Product Testing Final Report," CESG Contract X92A/4009309, CESG/BWG Biometric Test Programme; Centre for Mathematics & Scientific Computing, National Physical Laboratory (2001).
Matey et al., Iris on the Move: Acquisition of Images for Iris Recognition in Less Constrained Environments. Proceedings of the IEEE. Nov. 2006;94(11):1936-1947.
Miyazawa et al., Iris Recognition Algorithm Based on Phase-Only Correlation, The Institute of Image Information and Television Engineers, JapanJun. 27, 2006, vol. 30, No. 33, pp. 45-48.
Monro et al., An Effective Human Iris Code with Low Complexity. IEEE International Conference on Image Processing. Sep. 14, 2005;3:277-280.
Narayanswamy, et al., "Extended Depth-of-Field Iris Recognition System for a Workstation Environment," Proc. SPIE. vol. 5779 (2005) (10 pages).
Negin, et al., "An Iris Biometric System for Public and Personal Use," IEEE Computer, pp. 70-75, Feb. 2000.
Nguyen, et al., "Quality-Driven Super-Resolution for Less Constrained Iris Recognition at a Distance and on the Move," IEEE Transactions on Information Forensics and Security 6.4 (2011) pp. 1248-1558 (11 pages).
Non-Final Office Action for U.S. Appl. No. 10/809,471, dated Mar. 19, 2007, 12 pages.
Non-Final Office Action for U.S. Appl. No. 10/818,307, dated Jul. 10, 2008, 28 pages.
Non-Final Office Action for U.S. Appl. No. 10/818,307, dated Mar. 20, 2007, 22 pages.
Non-Final Office Action for U.S. Appl. No. 11/334,968, dated Jan. 6, 2009, 28 pages.
Non-Final Office Action for U.S. Appl. No. 11/377,042, dated Apr. 8, 2009, 22 pages.
Non-Final Office Action for U.S. Appl. No. 11/377,042, dated Jan. 7, 2008, 13 pages.
Non-Final Office Action for U.S. Appl. No. 11/510,197, dated Oct. 10, 2008, 36 pages.
Non-Final Office Action for U.S. Appl. No. 11/510,197, dated Oct. 8, 2009, 21 pages.
Non-Final Office Action for U.S. Appl. No. 11/849,969, dated Dec. 19, 2008, 17 pages.
Non-Final Office Action for U.S. Appl. No. 11/857,432, dated Dec. 30, 2008, 23 pages.
Non-Final Office Action for U.S. Appl. No. 12/429,695, dated Sep. 2, 2009, 11 pages.
Non-Final Office Action for U.S. Appl. No. 12/464,369, dated Jan. 2, 2015, 23 pages.
Non-Final Office Action for U.S. Appl. No. 12/464,369, dated May 9, 2012, 33 pages.
Non-Final Office Action for U.S. Appl. No. 12/576,644, dated Jul. 14, 2010, 14 pages.
Non-Final Office Action for U.S. Appl. No. 13/096,716, dated May 23, 2013, 16 pages.
Non-Final Office Action for U.S. Appl. No. 13/096,724, dated Jan. 16, 2014, 29 pages.
Non-Final Office Action for U.S. Appl. No. 13/096,728, dated May 7, 2013, 33 pages.
Non-Final Office Action for U.S. Appl. No. 13/096,728, dated Nov. 8, 2012, 37 pages.
Non-Final Office Action for U.S. Appl. No. 14/100,615, dated Mar. 4, 2015, 19 pages.
Non-Final Office Action for U.S. Appl. No. 14/509,356, dated Feb. 29, 2016, 19 pages.
Non-Final Office Action for U.S. Appl. No. 14/509,356, dated Mar. 16, 2017, 21 pages.
Non-Final Office Action for U.S. Appl. No. 14/509,366, dated Feb. 21, 2017, 25 pages.
Non-Final Office Action for U.S. Appl. No. 14/509,366, dated Mar. 3, 2016, 40 pages.
Non-Final Office Action for U.S. Appl. No. 14/846,090, dated Jan. 7, 2016, 35 pages.
Non-Final Office Action for U.S. Appl. No. 14/858,715, dated Mar. 14, 2016, 37 pages.
Non-Final Office Action for U.S. Appl. No. 14/863,936, dated Aug. 4, 2016, 16 pages.
Non-Final Office Action for U.S. Appl. No. 14/863,936, dated Sep. 26, 2017, 28 pages.
Non-Final Office Action for U.S. Appl. No. 14/863,950, dated Aug. 3, 2016, 15 pages.
Non-Final Office Action for U.S. Appl. No. 14/863,950, dated Sep. 26, 2017, 22 pages.
Non-Final Office Action for U.S. Appl. No. 14/863,960, dated Aug. 3, 2016, 21 pages.
Non-Final Office Action for U.S. Appl. No. 14/863,960, dated Sep. 28, 2017, 28 pages.
Non-Final Office Action for U.S. Appl. No. 15/475,425, dated Jul. 12, 2018, 31 pages.
Non-Final Office Action for for U.S. Appl. No. 12/464,369, dated Feb. 27, 2014, 25 pages.
Notice of Allowance dated Feb. 1, 2017 from U.S. Appl. No. 14/858,715, filed Sep. 18, 2015 (8 pages).
Notice of Allowance for U.S. Appl. No. 10/809,471, dated Mar. 24, 2008, 14 pages.
Notice of Allowance for U.S. Appl. No. 10/809,471, dated Oct. 5, 2007, 11 pages.
Notice of Allowance for U.S. Appl. No. 10/818,307, dated May 18, 2009, 8 pages.
Notice of Allowance for U.S. Appl. No. 11/334,968, dated Apr. 17, 2009, 11 pages.
Notice of Allowance for U.S. Appl. No. 11/377,042, dated Sep. 8, 2009, 16 pages.
Notice of Allowance for U.S. Appl. No. 11/510,197, dated Feb. 1, 2010, 13 pages.
Notice of Allowance for U.S. Appl. No. 11/849,969, dated Aug. 20, 2009, 21 pages.
Notice of Allowance for U.S. Appl. No. 11/849,969, dated Jul. 10, 2009, 18 pages.
Notice of Allowance for U.S. Appl. No. 11/857,432, dated Jun. 17, 2009, 17 pages.
Notice of Allowance for U.S. Appl. No. 12/429,695, dated Dec. 15, 2009, 7 pages.
Notice of Allowance for U.S. Appl. No. 12/429,695, dated Nov. 17, 2009, 12 pages.
Notice of Allowance for U.S. Appl. No. 12/464,369, dated May 8, 2015, 29 pages.
Notice of Allowance for U.S. Appl. No. 12/576,644, dated Dec. 10, 2010, 14 pages.
Notice of Allowance for U.S. Appl. No. 13/096,716, dated Oct. 30, 2013, 25 pages.
Notice of Allowance for U.S. Appl. No. 13/096,724, dated Aug. 19, 2014, 17 pages.

(56) References Cited

OTHER PUBLICATIONS

Notice of Allowance for U.S. Appl. No. 13/096,728, dated Feb. 7, 2014, 33 pages.
Notice of Allowance for U.S. Appl. No. 13/096,735, dated Jun. 24, 2013, 24 pages.
Notice of Allowance for U.S. Appl. No. 13/096,735, dated Oct. 4, 2013, 26 pages.
Notice of Allowance for U.S. Appl. No. 14/100,615, dated Sep. 28, 2015, 22 pages.
Notice of Allowance for U.S. Appl. No. 14/509,356, dated Aug. 1, 2017, 29 pages.
Notice of Allowance for U.S. Appl. No. 14/509,366, dated Jul. 31, 2017, 59 pages.
Notice of Allowance for U.S. Appl. No. 14/846,090, dated Jul. 25, 2016, 22 pages.
Notice of Allowance for U.S. Appl. No. 14/858,715, dated Feb. 1, 2017, 42 pages.
Notice of Allowance for U.S. Appl. No. 14/858,715, dated Feb. 1, 2017, 8 pages.
Notice of Allowance for U.S. Appl. No. 14/858,715, dated Mar. 1, 2017, 13 pages.
Notice of Allowance for U.S. Appl. No. 14/863,936, dated Mar. 20, 2018, 9 pages.
Notice of Allowance for U.S. Appl. No. 14/863,950, dated Mar. 27, 2018, 9 pages.
Notice of Allowance for U.S. Appl. No. 14/863,960, dated Mar. 20, 2018, 9 pages.
Office Action dated Aug. 3, 2016 from U.S. Appl. No. 14/863,950, filed Sep. 24, 2015 (15 pages).
Office Action dated Aug. 3, 2016 from U.S. Appl. No. 14/863,960, filed Sep. 24, 2015 (21 pages).
Office Action dated Aug. 4, 2016 from U.S. Appl. No. 14/863,936, filed Sep. 24, 2015 (16 pages).
Office Action dated Feb. 21, 2017 from U.S. Appl. No. 14/509,366, filed Oct. 8, 2014 (25 pages).
Office Action dated Mar. 14, 2016 from U.S. Appl. No. 14/858,715, filed Sep. 18, 2015 (9 pages).
Office Action dated Mar. 3, 2016 from U.S. Appl. No. 14/509,366, filed Oct. 8, 2014 (19 pages).
Ortiz et al., An Optimal Strategy for Dilation Based Iris Image Enrollment. IEEE International Joint Conference on Biometrics. 6 pages, Sep. 29-Oct. 2, 2014.
Restriction Requirement for U.S. Appl. No. 11/510,197, dated May 16, 2008, 12 pages.
Robert J.K. Jakob, "Eye Movement Based Human Computer Interaction Techniques; Toward Non-Command Interfaces," Advances in Human-Computer Interaction, vol. 4, ed. by H.R. Hartson and D. Hix, pp. 151-190, Ablex Publishing Co., Norwood, N.J. (1993).
Robert J.K. Jakob, "Eye Tracking in Advanced Interface Design," in Virtual Environments and Advanced Interface Dseign, ed. by W. Barfield and T.A. Furness, pp. 258-288, Oxford University Press, New York (1995).
Roth, Mouthpiece Meditations, Part 3. Online Trombone Journal, www.trombone.org. 5 pages, Jul. 23, 2018.
Schovanec, Ocular Dynamics and Skeletal Systems, IEEE Control Systems Magazine. Aug. 2001;21(4):70-79.

Scoblete, The Future of the Electronic Shutter. pdn, Photo District News, retrieved online at: https://www.pdnonline.com/gear/cameras/the-future-of-the-electronic-shutter/, 6 pates, May 9, 2016.
Second Japanese Office Action for Application 2015-545911 dated Feb. 26, 2018 ( with English translation).
SRI International, "Seeing the Future of Iris Recognition", available at www.sri.com/iom, Mar. 2014, 9 pages.
Swiniarski, Experiments on Human Recognition Using Error Backpropagation Artificial Neural Network. Neural Networks Class (CS553) of San Diego State University Computer Science Department, Apr. 2004.
Tan et al., Efficient Iris Recognition by Characterizing Key Local Variations. IEEE Transactions on Image Processing. Jun. 2004;13(6):739-750.
U.S. Appl. No. 14/100,615, "Iris Biometric Matching System", filed Dec. 9, 2013, 57 pages.
U.S. Appl. No. 14/100,615, "Iris Biometric Matching System," filed Dec. 9, 2013, 61 pages.
U.S. Appl. No. 61/888,130, filed Oct. 8, 2013, 20 pages.
Van der Wal, et al., "The Acadia Vision Processor," IEEE International Workshop on Computer Architecture for Machine Perception, pp. 31-40, Padova, Italy, Sep. 11-13, 2000.
Weisstein E. et al.; "Circle" From MathWorld—A Wolfram Web Resource. www.mathworld.wolfram.com/circle.html, pp. 1 to 8., Jul. 3, 2008.
Wildes, R., "Iris Recognition: An Emerging Biometric Technology," Proc. IEEE, 85(9):1348-1363, Sep. 1997.
Written Opinion for Application No. PCT/US2015/051863, dated Dec. 10, 2015, 5 pages.
Written Opinion for Application No. PCT/US2017/065793, dated Feb. 16, 2018, 10 pages.
Written Opinion of the International Searching Authority dated Jun. 28, 2018, issued in connection with International Application No. PCT/US2018/025895 (10 pages).
www.m-w.com--definition—"ellipse" (Refer to Ellipse Illustration; also attached) pp. 1 of 2.
Yokoya, Ryunosuke, and Shree K. Nayar. "Extended depth of field catadioptric imaging using focal sweep." Proceedings of the IEEE International Conference on Computer Vision. 2015.
Zhu, et al., "Biometric Personal Identification Based on Iris Patterns," Pattern Recognition, Proceedings 15th International Conference on vol. 2 IEEE (2000) (4 pages).
Singapore Search Report and Written Report for Application No. 11201704097X, dated Mar. 13, 2018, 5 pages.
Extended European Search Report in connection with European Patent Application No. 15864635.6 dated Jun. 6, 2018 (8 pages).
U.S. Appl. No. 15/471,131, filed Mar. 28, 2017, Published.
U.S. Appl. No. 15/475,425, filed Mar. 31, 2017, Published.
U.S. Appl. No. 15/514,098, filed Mar. 24, 2017, Published.
U.S. Appl. No. 15/661,188, filed Jul. 27, 2017, Published.
U.S. Appl. No. 15/661,246, filed Jul. 27, 2017, Published.
U.S. Appl. No. 15/661,267, filed Jul. 27, 2017, Published.
U.S. Appl. No. 15/661,297, filed Jul. 27, 2017, Published.
U.S. Appl. No. 15/661,340, filed Jul. 27, 2017, Published.
U.S. Appl. No. 15/944,327, filed Apr. 3, 2018, Published.
U.S. Appl. No. 16/039,442, filed Jul. 19, 2018, Pending.
U.S. Appl. No. 15/839,202, filed Dec. 12, 2017, Published.

* cited by examiner

SYSTEM AND METHOD FOR MOBILE DEVICE BIOMETRIC ADD-ON

CROSS-REFERENCES TO RELATED APPLICATIONS

This application claims priority to and the benefit of U.S. Provisional Patent Application Ser. No. 62/086,867, filed Dec. 3, 2014, and entitled "System and Method for Mobile Device Biometric Add-On", the disclosure of which is incorporated herein in its entirety.

BACKGROUND

The present disclosure is related to electronic systems and devices. More specifically, the present disclosure is generally directed to systems, device, and methods of modifying an optical pathway of a camera of an electronic system or device.

Many mobile devices, including some smartphones, tablets, digital cameras, or other mobile devices, in addition to other sensors, are equipped with a single front-facing camera arranged on the same side as the display or touch screen of the device. In some applications, the front-facing cameras can be utilized for user identification, generating biometric information that allows the device to be unlocked or operated in a secure fashion. In addition, biometric information may also be used to carry out functions that are specific to an identified user. For example, devices with front-facing cameras can be utilized for iris recognition. However, many biometric devices impose strict guides for operation in order to meet the needs of biometric analysis. For instance, present applications for iris recognition require captured images to have a clear, straight-on view of the iris. Hence, a subject needs to be stationary, as well as located very near and directly in front of the device camera.

In general, suitable biometric information may be readily acquired using devices fitted with a rear-facing camera, since an operator would be able to view the display and adjust the device so that the camera can properly acquire imagery of the subject. However, for those devices that do not possess a rear-facing camera, operation can be difficult or awkward, particularly for applications in which a subject or scenery other than the device operator is being viewed. Hence, many present devices are not suitable or desirable for use in biometric applications, such as iris, retinal, or facial recognition.

Devices lacking specific capabilities or features can be upgraded with the addition of new hardware. However, full integration of the new hardware often requires complex and costly modifications to design and manufacturing processes. After-market add-ons, on the other hand, offer an alternative, cost-effective way of reversibly expanding mobile device capabilities without directly changing the mobile device hardware. Add-ons act as modifiers to the available inputs or outputs, using support applications that can run under the existing device operating systems. For example, commercially available add-on products for mobile device cameras include telephoto and fish-eye lenses, which are designed to provide enhanced zoom, or wider angle imaging, respectively, beyond the capabilities of the as-designed cameras.

Given the above, there is a need for modifiers or adaptations that can enhance the capabilities of presently limited devices without directly modifying the existing hardware. In particular, there is a need for modifiers or adaptations directed to devices for use in biometric applications.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1A:
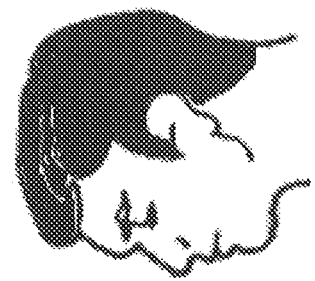
FIG. 1A is a schematic illustrating use of a mobile device with a forward-facing element.
Figure 1A:
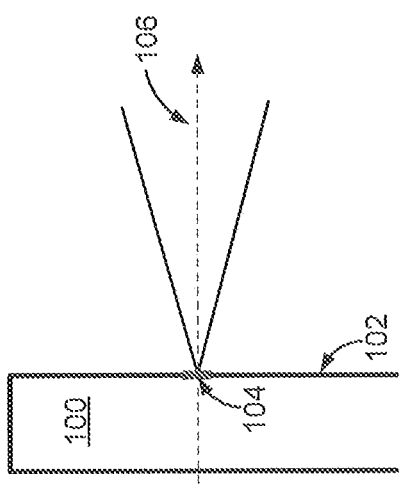

The present disclosure describes a novel approach for expanding the capabilities of currently limited devices. In particular, the functionality of mobile and other devices can be enhanced using add-on elements and features, in accordance with embodiments described herein, without need for changing their existing hardware. Specifically, in some aspects, the optical pathways of components fitted on a mobile or other device can be modified using one or more passive optical elements. This allows the range of sensors, illuminators, and other mobile device components to extend in directions beyond the as-designed capabilities, increasing device flexibility and applicability.

The present approach includes a broad range of applications, including biometric enrollment and recognition. Advantageously, the provided approach, in the form of various add-ons, can be produced at low cost and is installable on standard, mass-produced mobile devices. For instance, a handheld mobile device configured to acquire biometric information from a subject is beneficial due to the small size, weight and cost of mobile device platforms. In the case that such mobile device is equipped with front-facing biometric capabilities, the range of applicability would be limited. Hence, a holder with an optical assembly configured to modify the optical pathway of the front-facing camera, in accordance with embodiments of the disclosure, would extend use of the device to include rear-facing directions. That is, by redirecting the front-facing camera and illuminators of the device towards a rear-facing direction, imagery and subjects other than the operator can also be imaged. Other benefits and advantages may be readily apparent from descriptions below.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Figure 1B:
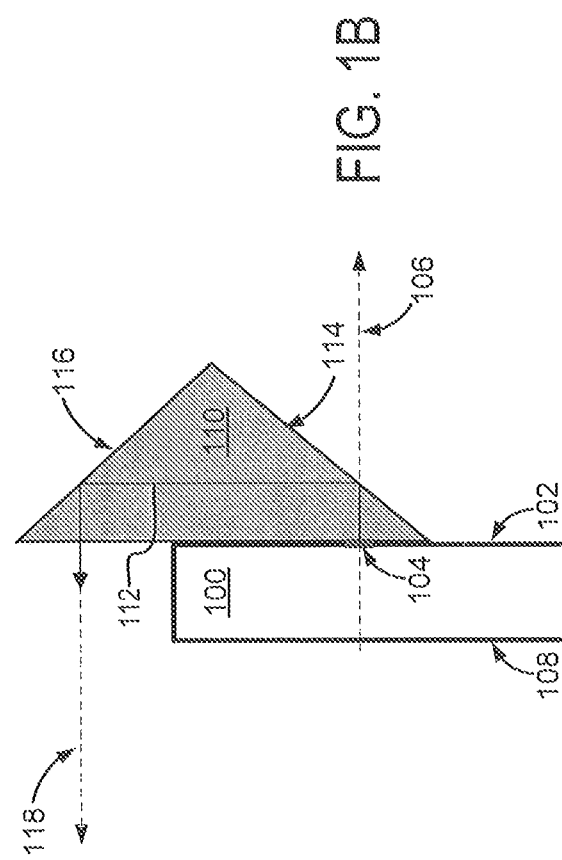
FIG. 1B is a schematic illustrating at least one embodiment of the present disclosure.
Figure 1B:

Referring now to FIGS. 1A and 1B, simplified illustrations depicting concepts in accordance with the present disclosure are shown. In particular, FIG. 1A shows a subject oriented toward a general direction of a device 100 (not drawn to scale), and more specifically toward a front portion 102 of the device 100. For example, in some implementations, the device 100 may be a mobile device, such as a smartphone, a tablet, a digital camera, or any other mobile device. Optionally, in some implementations, the device 100 may be any device with a camera, for example, a computer, monitor, or any other device. As shown, the front portion 102 includes a front location 104 on the device 100 where various device components, for sensing or other functions, may be located. Example device components can include a camera, a camera illuminator, and so forth. As may be appreciated from FIG. 1A, illumination produced at the front location 104, for instance, would inherently travel along a front-facing direction 106, as shown in FIG. 1A. Similarly, image capture at the front location 104 using a front-facing camera, for instance, would also be achieved by way of light traveling along the front-facing direction 106. Thus, it is apparent that the range of the device components fitted on the front portion 102 of the device 100 of FIG. 1A would be limited to fields of view along the front-facing direction 106.

In accordance with aspects of the present disclosure, the above-described limitation of the device 100 can be overcome by utilizing an optical assembly configured to reversibly modify the optical path of the device components fitted on the device 100. As will be described, in some implementations, the optical assembly may be reversibly coupled to the device 100 using a device holder, or placed proximate to the device 100. In addition, the optical assembly may be configured to modify the optical paths of the device components using a number of passive optical elements included therein. In this manner, an increased the functionality can be achieved for the device 100, for instance, by allowing sensing or illumination of a subject not directly in front of the sensing or illumination component of the device 100.

Specifically referring to FIG. 1B, a simple non-limiting configuration for enhancing the functionality of the device 100 described with reference to FIG. 1A, is illustrated. As shown, a single passive optical element, in the form of an optical prism 110, can be placed proximate to or be coupled to the device 100 such that the optical path 112 of a device component positioned at the front location 104 can be modified. In particular, the prism 110 may include a first reflective surface 114 and a second reflective surface 116, with each reflective surface providing substantial reflection of light, such that a resultant optical path 112 of the device component is substantially modified. For example, the optical path 112 of an illuminator located at the front location 104 may generally undergo a first directional change of approximately 90 degrees at the first reflective surface 114 of the prism 110, followed by a second directional change of approximately 90 degrees at the second reflective surface 116, resulting in an orientation of the optical path 112 along a rear-facing direction 118, as shown in FIG. 1B. In this regard, a light ray, or a beam of light, originating from the front location 104 can be substantially retro-reflected in a direction substantially opposite to the initial direction. As a result, an illumination of the subject facing the rear portion 108 of the device 100 may be readily achieved without need for rear-facing illumination capabilities. Similarly, imaging of a subject facing the rear-portion 108 of the device 100 may be acquired using a front-facing camera positioned at the front location 104.

While the specific embodiments herein are discussed in relation to changing the path of a device component from a front-facing direction to a rear-facing direction, the present specification is intended to cover changing the path of a device component from a first direction to a second direction. In this manner, the first and second directions may be at an angle of about 180 degrees with respect to one another or may be at any other angle with respect to one another. The first and second directions may be at any other suitable angle. In illustrative embodiments, the first and second directions may be at an angle of between about 30 degrees and about 330 degrees or between about 45 degrees and about 180 degrees. In some embodiments, the first and second directions may be at angle of about 45 degrees.

Figure 1C:
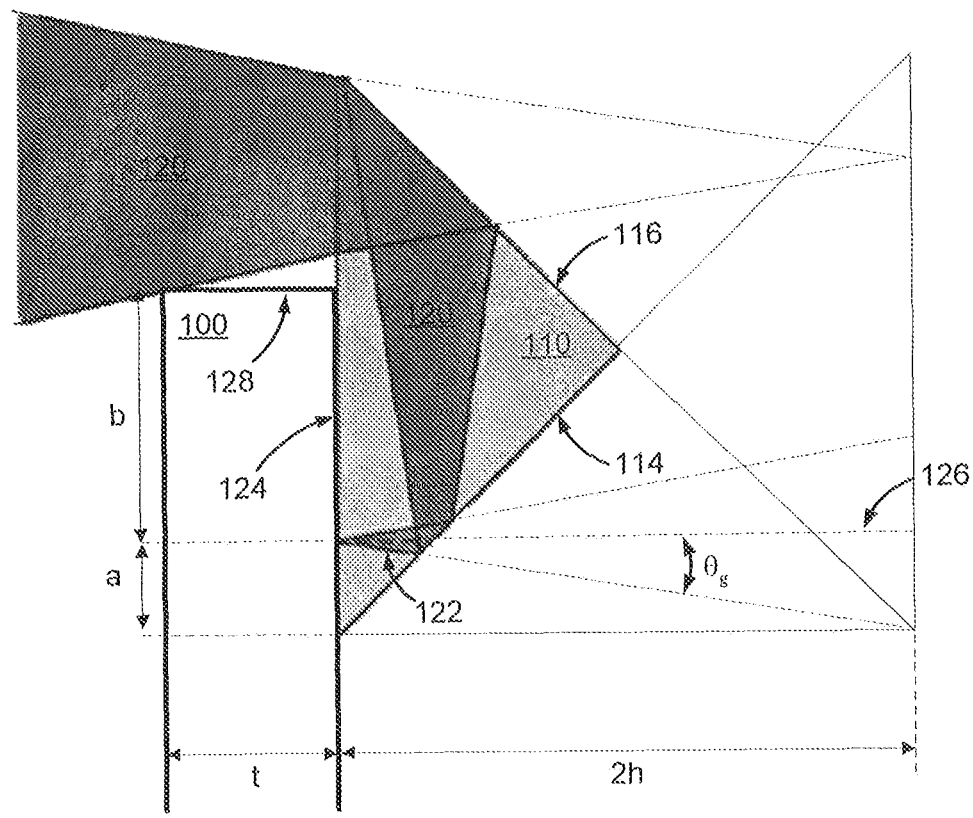
FIG. 1C is a schematic illustrating illumination tracing using the embodiment of FIG. 1B.

By way of example, a TabPro device equipped with front-facing near infrared ("NIR") light emitting diode ("LED") emits a diverging beam 120 that propagates along an initial, forward-facing direction while diverging with half-angle of approximately 12° half-width at half maximum ("HWHM"), as shown in FIG. 1C. Upon encountering the first reflecting surface 114, of a glass prism 110 with a refractive index of 1.5, for example, the divergence drops to 8°. In addition, about 80% of the light incident on the glass-air interface of the first reflecting surface 114 experiences total internal reflection ("TIR"), while the remainder of light is not within the TIR angle. The internally reflected light is then reflected by a second glass-air interface at the second reflecting surface 116, exiting with the original 12° divergence and traveling in a substantially opposite direction compared to the initial direction.

As appreciated from descriptions above, the nature of optical path modification of various device components, including sensors and other elements, can depend on geometrical factors, the characteristics of the sensors or elements themselves, the optical properties of the optical assembly, as well as requirements by the particular applications of the device 100. For instance, in some aspects, it may be desirable to minimize the size of the optical assembly, either to due cost, design, or esthetic considerations.

For example, referring again to FIG. 1C, conditions on minimum size for the prism 110 used with the device 100 may be obtained by examining the rays of the diverging beam 120 produced by the MR LED illuminator. Specifically, in order for the ray 122 most normally incident upon the first reflecting surface 114 to hit the hypotenuse 124 of the prism 110 after hitting the second reflecting surface 116, the following condition needs to be satisfied:

$$\tan\theta_g \le \frac{a}{2h} \quad (1)$$

where $\theta_g$ represents the angle between the normal direction of the device 100 and the ray 122, a is the distance between the bottom of the prism 110 and the vertical position 126 of the illuminator, and $2h$ is the length of the hypotenuse 124. For an LED illuminator with 12° divergence in air, for example, the distance a can then be computed to be then at least 14% of the length of the hypotenuse 124 according to Eqn. 1. In addition, in order for the retro-reflected diverging beam 120 to clear the top 128 of the device 100, the following condition needs to be satisfied:

$$4h \cdot \tan\theta_g + t \cdot \tan\theta_a \le 2h - a - b \quad (2)$$

where $\theta_a$ represents the refracted angle in air, b is the distance from the top 128 of the device 100 to a vertical position 126 of the illuminator, and t is the thickness of the device 100. Converting Eqn. 1 to an equality and making a substitution into Eqn. 1 gives a minimum length for the hypotenuse 124 of the prism 110, namely $$h \ge \frac{b + t \cdot \tan\theta_a}{2 - 4\tan\theta_g}. \quad (3)$$

For instance, a TabPro device has dimensions t=7.3 mm and b=10 mm. Hence, using Eqn. 3 gives 2 h≥16 mm, or roughly a prism 110 with hypotenuse 124 of approximately 20 mm in length, where about a 20% margin was added.

It may be appreciated that concepts illustrated in the configurations shown in FIGS. 1B-1E can be suitable for a variety of applications and devices. For example, one application can include biometric enrollment and recognition, where biometric information may be obtained using images acquired while a subject is facing away from the front-facing camera of the device. However, the examples shown are provided for illustrative purposes. Indeed, modifications, in dependence of the specific application, may be possible. For instance, rather than using a single optical element, such as a prism, an optical assembly may be configured to modify the optical pathways using a number of passive optical elements, such as prisms, mirrors, and/or other components fashioned using materials and geometrical properties capable of modifying optical pathways. In addition, the divergence of the NIR LEDs, for example, could allow some light to escape beneath the critical angle for TIR of a prism. This would reduce the signal-to-noise ratio ("SNR") in an iris recognition application. Hence, it is envisioned that coating the prism with a Gold or Aluminum layer might help eliminate such loss mechanism, although could result in loss due to metallic absorption at 850 nm. As such, the prism could be designed to eliminate losses by angling the first reflective surface more steeply, for example, relative to the incident rays. In addition, light lost through a prism could be compensated by increasing exposure time and corresponding pulse width. Additional sources of illumination, such as a rear-facing illuminator could also enhance SNR.

Figure 2A:
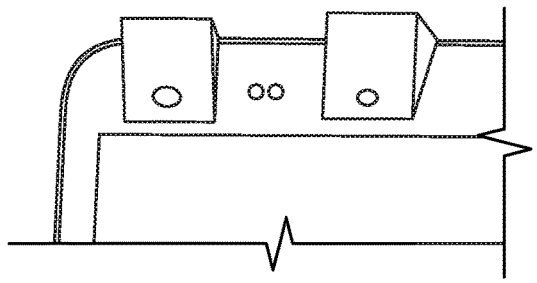
FIG. 2A is a front view image showing a configuration that includes two prisms placed on a front of a mobile device, in accordance with aspects of the present disclosure.
Figure 2B:
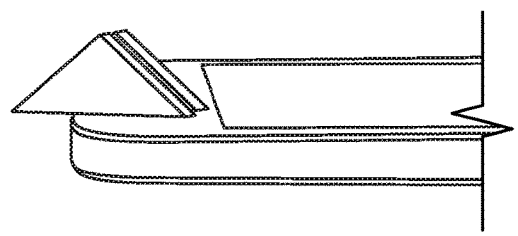
FIG. 2B is a side view image of the configuration shown in FIG. 2A.
Figure 2C:
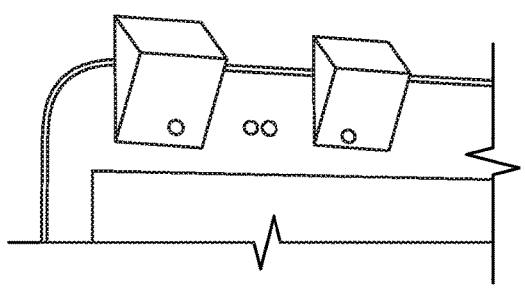
FIG. 2C is a perspective view image of the configuration shown in FIG. 2A.
Figure 2D:
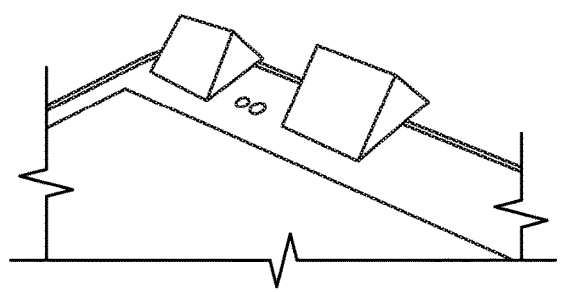
FIG. 2D is another perspective image of the configuration shown in FIG. 2A.
Figure 2E:
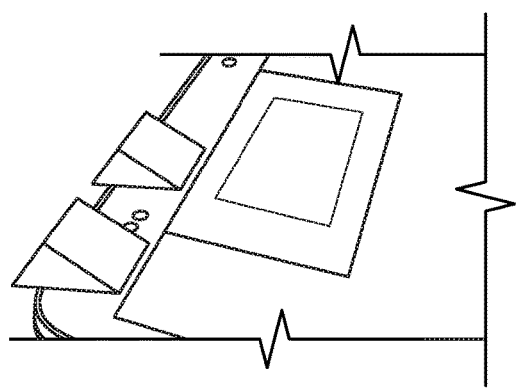
FIG. 2E is an oblique view image showing prisms temporally mounted on a mobile device.
Figure 2F:
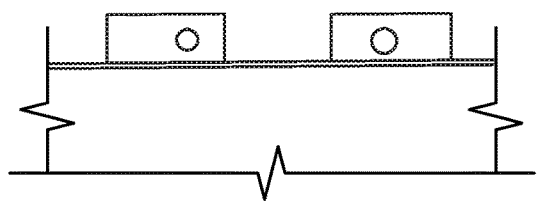
FIG. 2F is a rear view image of the configuration shown in FIG. 2E, illustrating a view of a front camera and a camera illuminator.

In an example demonstrating the concepts above, two Edmund Optics 15 mm prisms (part number 32332, hypotenuse=21.2 mm) and a TabPro were used to generate clear, focused, and well lit images of irises, for example, for use in biometric recognition. Referring to FIGS. 2A-2F, images of the prisms temporarily placed or mounted on the TabPro are shown. This configuration was used to image a rear-facing subject using the front-facing camera of the TabPro. In addition, this configuration was used to reverse the direction of the front-facing LED to illuminate the subject. A rear-facing image of the TabPro shows retro-reflected LED and camera clearly visible (FIG. 2F).

Test imagery taken using the TabPro (omitted from the drawings for privacy reasons) in this configuration provided good focus and reasonable illumination. To obtain enrollment images, the TabPro operator held the tablet approximately 8 inches from the subject while centering the subject's eye in the target box. Using the rear-facing mode, the enrolled irises were all quickly matched in 4/4 subjects (8 irises). Aiming with flipped and mirror reversed imagery necessitated some training, hence it is envisioned that software modifications might be utilized to provide more intuitive views of the subjects to the operator. Also, the test images showed specular reflections either centered or slightly to the lower right of the pupil. In some aspects, robust matching to standard enrollment images might necessitate an accommodation to allow for wider or different specular reflection position in flipped and reversed eye images. Nonetheless initial attempts showed that eye-finding in the raw image followed by image reversal and inversion (accomplished in one step by 180 degree rotation, for example) produced matchable images to standard enrollments.

Referring to FIGS. 3A-3D, a holder 302 for a mobile device 300, in accordance with aspects of the present disclosure, is shown. The holder 302 may be configured to be attached or clipped, for example, to the top the mobile device 300, as shown. In general, the holder 302 may include a base 304, and an optical assembly 306 coupled to the base 304, wherein the optical assembly 306 is configured for modifying optical paths of various components of the mobile device 300, such as a camera and/or camera illuminator. As shown in FIGS. 3A-3D, the optical assembly 306 includes two prisms 308 configured to be placed proximate to the various components of the device 300, for example, a camera and a camera illuminator affixed to a front portion of the mobile device 300, modifying their respective optical paths. However, fewer or more, as well as different optical elements may be used in the optical assembly 306. In addition, the optical elements may include any suitable materials, including glass, plastic, metal, and/or any other suitable materials.

Figure 3A:
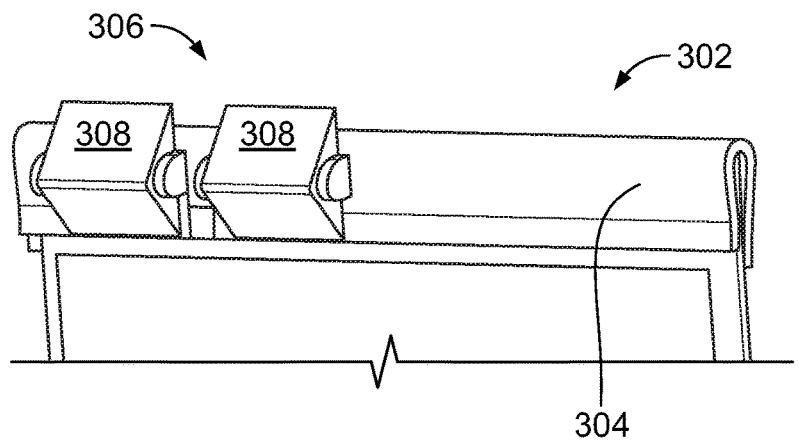
FIG. 3A is a perspective front view illustrating at least one embodiment of a mobile device holder, in accordance with aspects of the present disclosure.
Figure 3C:
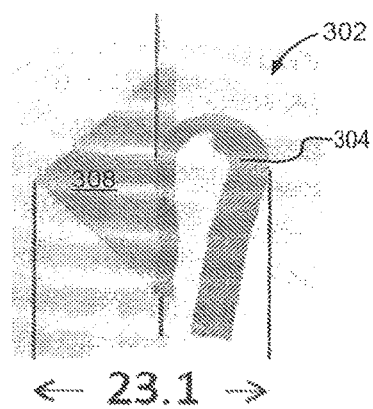
FIG. 3C is side view of the embodiment shown in FIG. 3A.
Figure 3B:
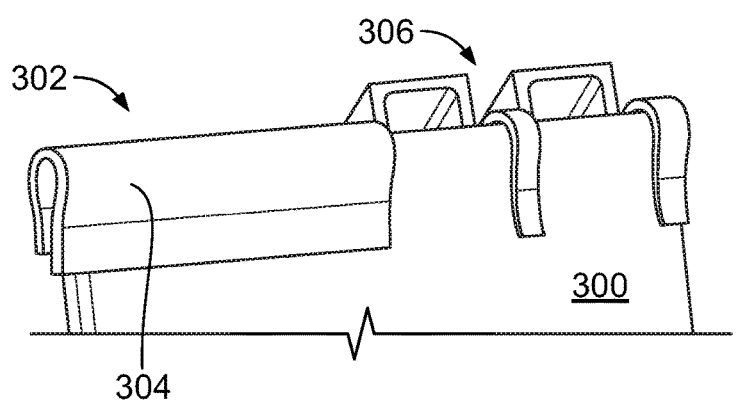
FIG. 3B is perspective a rear view of the embodiment shown in FIG. 3A.
Figure 3D:
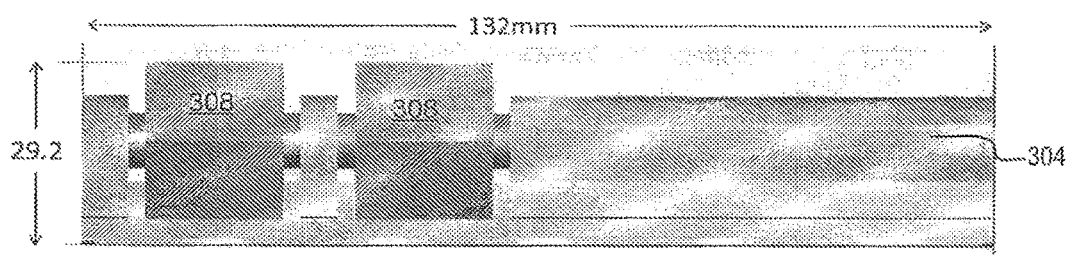
FIG. 3D is front view of the embodiment shown in FIG. 3A.
Figure 3E:
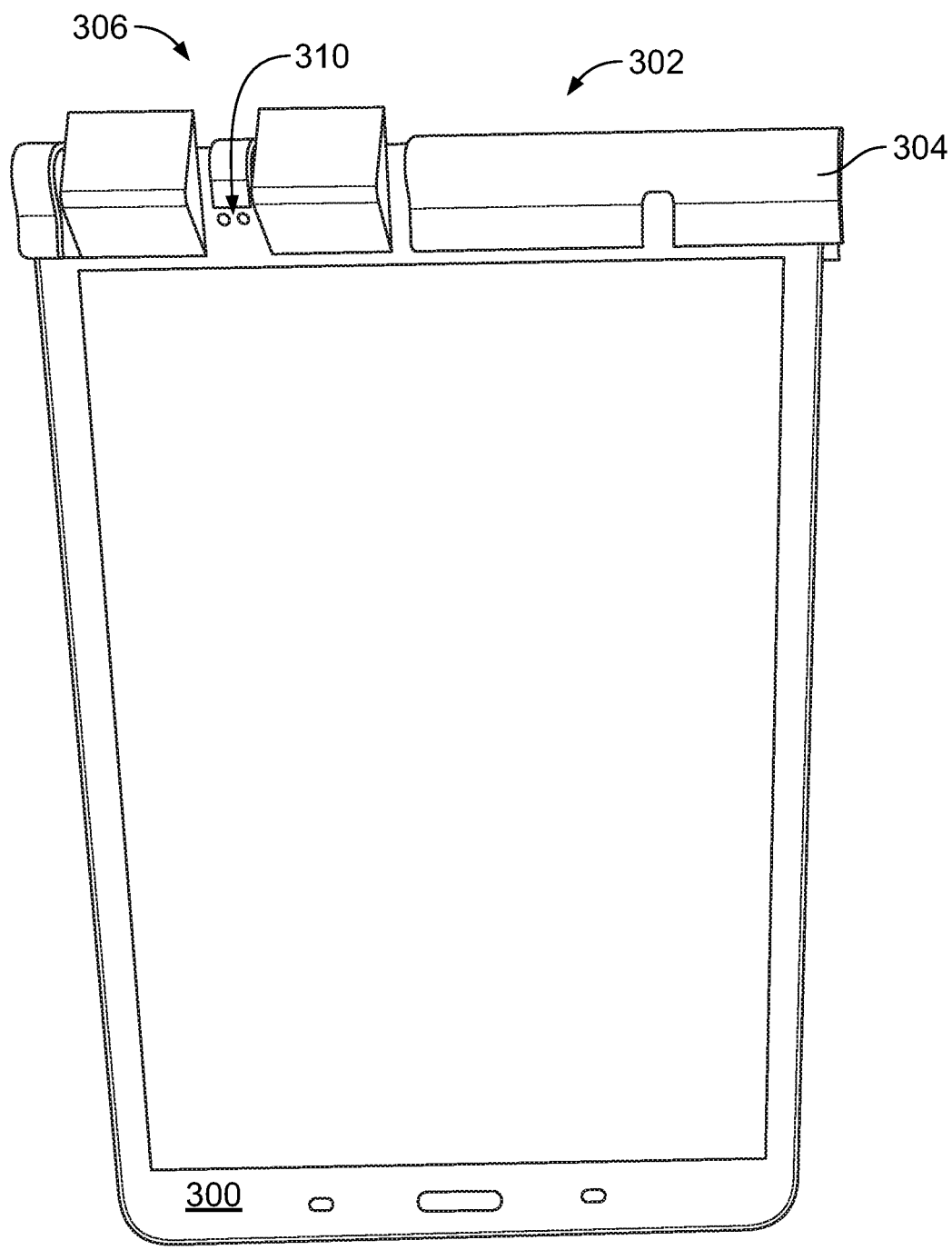
FIG. 3E is a perspective front view of the embodiment shown in FIG. 3A.

The holder 302 may be shaped and dimensioned in any manner, depending upon the particular application and mobile device 300 being utilized. In some aspects, the holder 302 may be fabricated from acrylonitrile butadiene styrene (ABS) plastic using a 3D printing technique. However, it may be appreciated that the holder 302 may be manufactured in any manner, and using any materials. In addition, it may be preferable that the holder 302 is designed to withstand moderate handling due to attaching and detaching it from the mobile device 300. In some implementations, the holder 302 may be configured to take advantage of proximity sensors fitted on a mobile device 300, as indicated by arrow 310 in FIG. 3E. In this manner, a software algorithm, such as an iris recognition algorithm, may be informed regarding whether the holder 302 is attached or being used.

Figure 8:
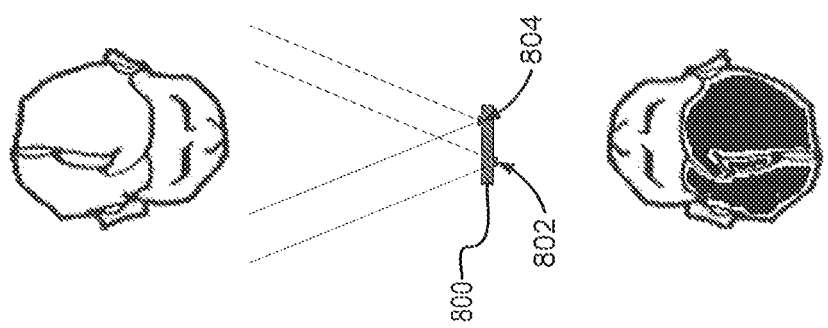
FIG. 8 is an illustration depicting use of front-facing and rear-facing device components, in accordance with aspects of the present disclosure.
Figure 8:
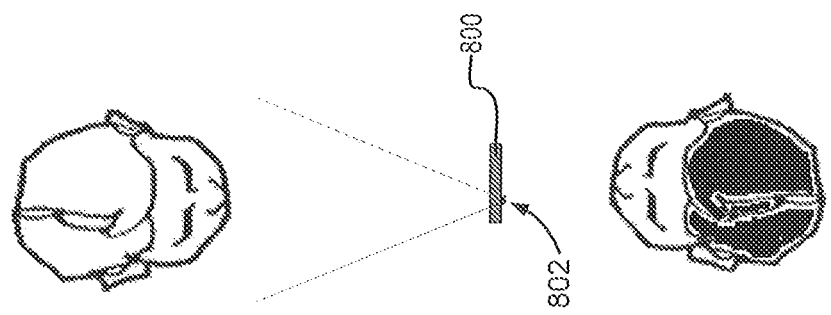

The embodiment described with reference FIGS. 3A-3E illustrates a simple and cost effective approach to expanding the functionality of a mobile device 300. However, the features and configuration described are non-limiting, and indeed various modifications can be possible. For instance, the mobile device 300, in additional to being equipped with front-facing camera or illuminator, may also include a rear-facing camera and illuminator. As such, the holder may be adapted to such designs. In fact, in some options, the optical paths of such rear-facing components may also be modified. For example, a rear-facing illuminator may also be redirected to the front of the device, in the manner described, providing additional illumination, for example, in a biometric recognition application. In addition, in some implementations, as shown in FIG. 8, both the front-facing 802 and rear-facing cameras 804 of a mobile device 800 may be operated, as well as respective illuminators, to acquire images of the same subject or scenery, sequentially or substantially concurrently. Such dual camera images may be processed and combined, for instance, to generate an enhanced image of the subject or scenery. In applications, dual camera images may be combined to produce an image of the subject or scenery indicative of depth, or providing an illusion of depth.

Figure 4A:
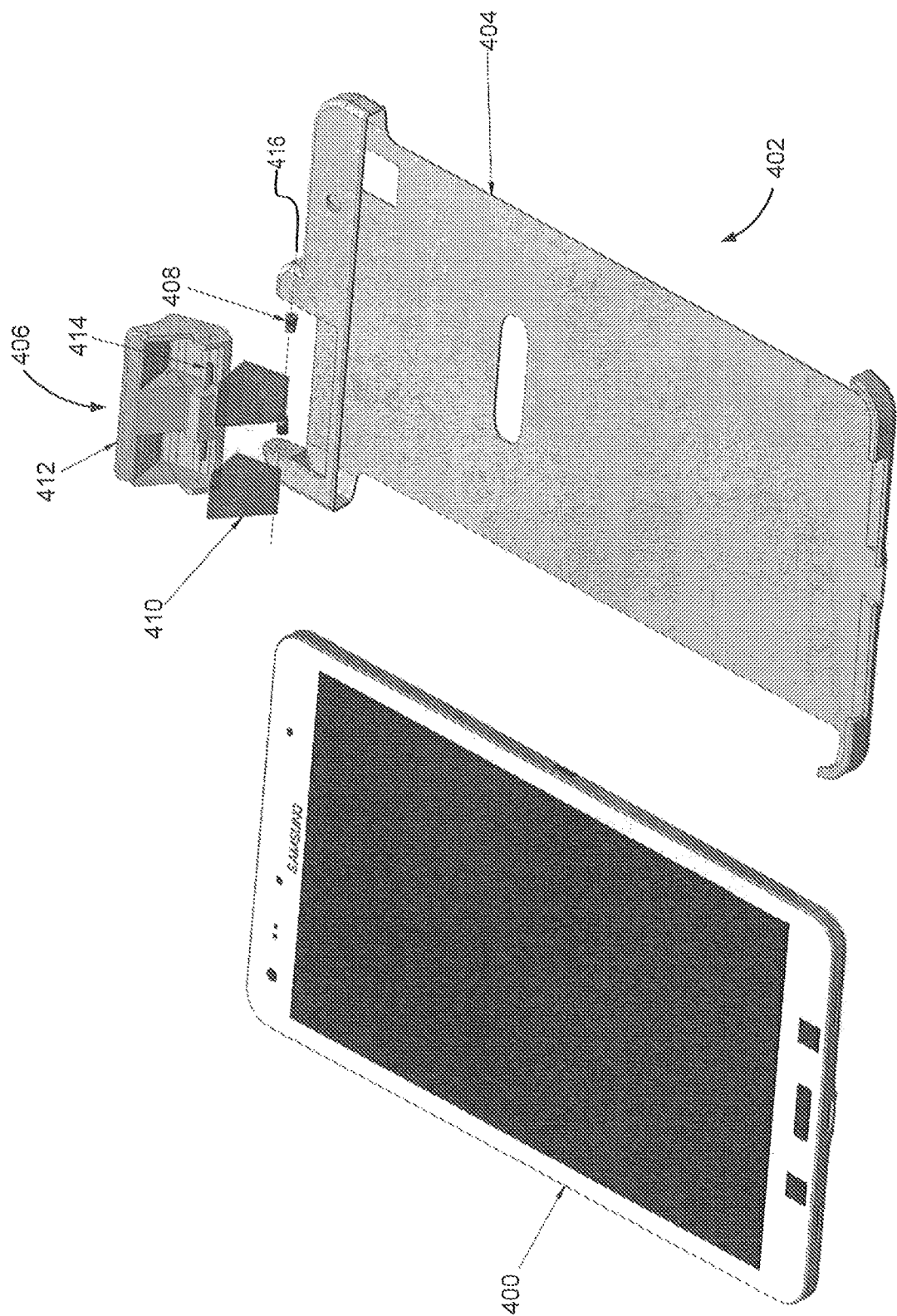
FIG. 4A is a perspective front view illustrating at least one embodiment of a mobile device holder, in accordance with aspects of the present disclosure.

Referring now to FIG. 4A, an illustration depicting another embodiment of holder 402 for a mobile device 400, in accordance with aspects of the present disclosure, is provided. The holder 402 includes a base 404 attachable to the mobile device 400, and an optical assembly 406 movably coupled to the base 404, held in place, for instance, using heat set screws 408. In some aspects, the holder 402 may be utilized to increase the functionality of the mobile device 400 for use in biometric recognition applications, for instance.

In particular, the base 404 can be configured in any manner and include a variety of features, in accordance with the features and design of the mobile device 400. Specifically, the base 404 may be designed to be attachable to the mobile device 400 while avoiding interference with operation of the mobile device. For instance, as shown in FIG. 4A, the base 404 may be shaped and dimensioned so as to allow a charger to be coupled to the mobile device 400. Also, the base 404 may shaped and dimensioned, or include openings so as not to obstruct visibility or operation of various components on the mobile device 400, such as cameras, illuminators, logos, buttons, display, and so forth. In some aspects, the base 404, or alternatively the optical assembly 406, may engage, using appropriately designed features, with proximity sensors fitted on the mobile device 400, thus informing the mobile device 400 whether the holder 402 is in use.

The optical assembly 406 may include a number of passive optical elements 410 configured to modify the optical pathways of various device components, such as a camera or camera illuminator, and a housing 412 for the optical assembly 406, which may or may not enclose the passive optical elements 410 completely. As shown in FIG. 4A, the passive optical elements 410 can be in the form of prisms, secured to the optical assembly 414 using set screws, for example, or permanently attached, for example, using adhesives. It may be appreciated that any passive optical elements may be utilized, including mirrors, and other materials with similar optical properties, and as such, the configuration of the optical assembly 406 may vary.

Figure 4B:
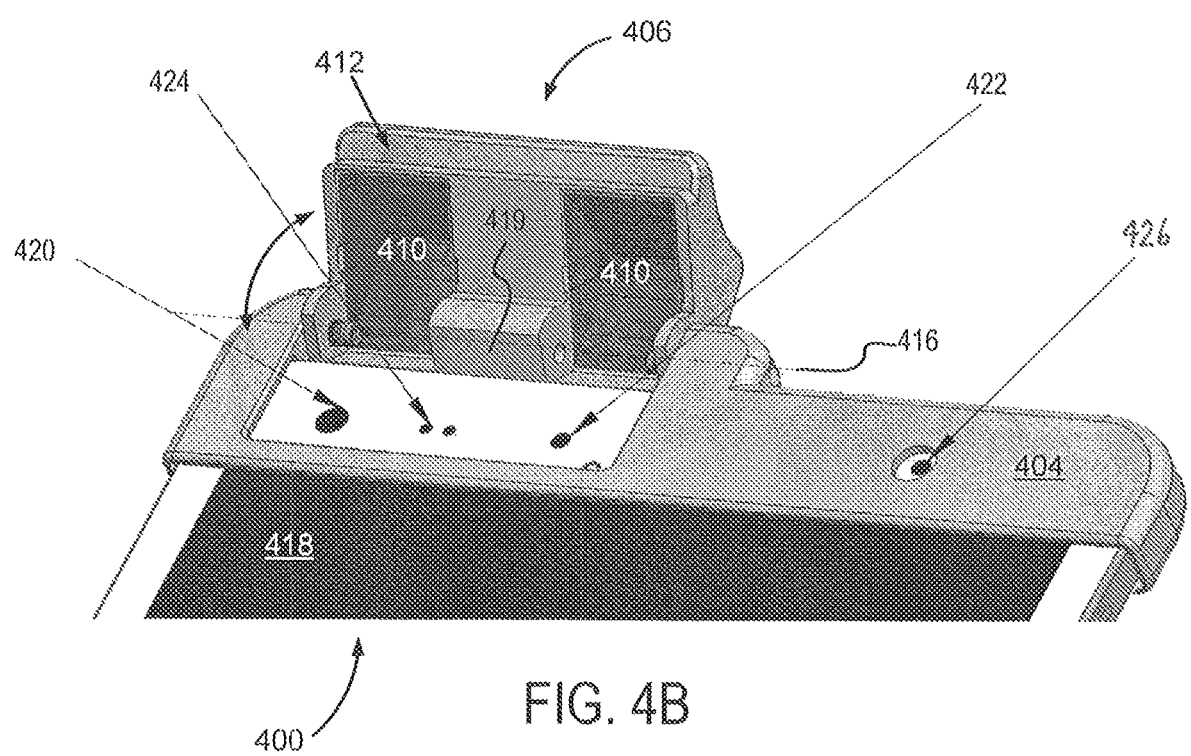
FIG. 4B is an enlarged view of an optical assembly of the embodiment shown in FIG. 4A.

FIG. 4B shows how the holder 404 can engage with and operate relative to the mobile device 400, which may include a smartphone, tablet, or other device. As shown, a front portion 418 of the mobile device 404 may be fitted with multiple device components, including a camera 420, an illuminator 422 and proximity sensors 424. When operating the optical assembly 406, by rotating or pivoting the optical assembly 406 about an axis 416 relative to the base 404, a contact can be made, and maintained using an appropriate locking mechanism, between the device components and the passive optical elements 410 configured on the optical assembly 406. In some implementations, a substantial contact can be made, such that a negligible amount of light scattering takes place at the interface of, or between, the passive optical elements 410 and the device components, while also avoiding damage to either component or element. As a result, optical pathways of respective device components can be modified. For instance, a view of front-facing camera and respective illumination can be directed to the rear of the mobile device 400, as shown in the implementation of FIG. 4B. In addition, in some designs, the housing 412 of the optical assembly 406 includes a sensor surface 419, as shown in FIG. 4B, configured for affecting signals generated by the proximity sensors 424, informing an engagement of the optical assembly 406. An optional sleeve 426 may be utilized to protect the mobile device 400.

The above-described holder 404 is not limited to the specific implementation detailed with respect to FIGS. 4A and 4B. As such, one of ordinarily skill would readily appreciate that various modifications are possible. For example, the optical assembly 406 may alternatively, or additionally, include capabilities for modifying or interrupting optical paths of various components fitted on the rear portion of the mobile device 400. In this manner, various combinations of illumination and imaging may be obtained using a device equipped with cameras and illuminators on both sides of the device, for example, as described.

Figure 5:
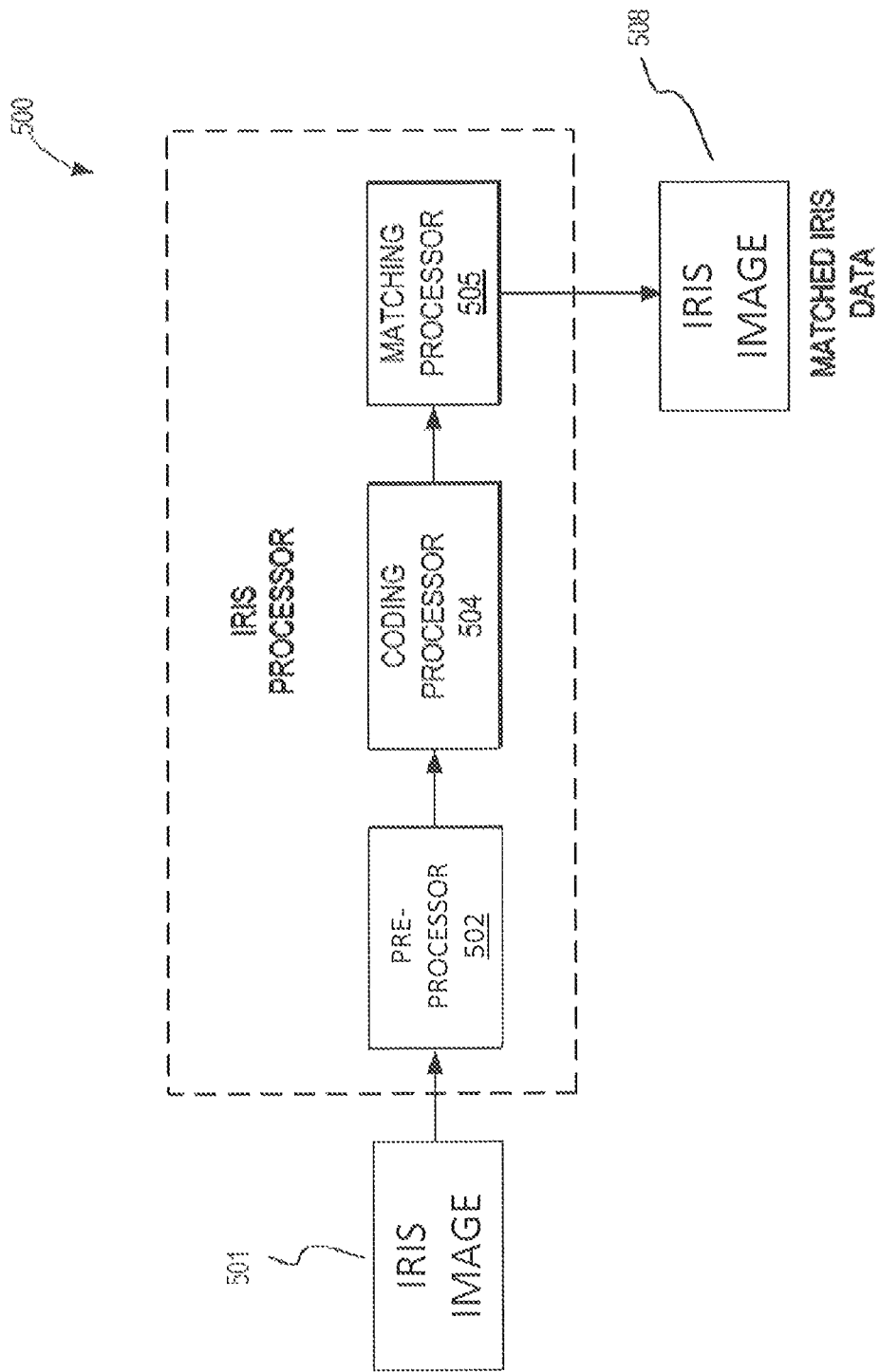
FIG. 5 depicts a simplified block diagram of at least one embodiment of an iris processor for biometric iris matching, including a pre-processor, as disclosed herein.

As noted above, the add-ons disclosed herein may be utilized for any number of functions, for example, for biometric recognition. FIG. 5 depicts a block diagram of an iris processor 500 for biometric iris matching for use in conjunction with any of the add-ons disclosed herein. The iris processor 500 comprises a pre-processor 502, a coding processor 504 and a matching processor 506. The iris processor 500 receives images as input, for example, input image 501 and outputs a matched iris 508 obtained from a remote or local database, for instance. An actual input image 501 and an actual matched iris 508 are omitted from FIG. 5 for privacy reasons. Those of ordinary skill in the art would recognize that the database may be accessed as a "cloud" service, directly through an internet connection, or the like. The pre-processor 502, the coding processor 504 and the matching processor 506 may execute on a single device, or on different devices, servers, cloud services or the like, as indicated by the dashed outline of the iris processor 500. The iris processor 500 may be modular and each processor may be implemented, e.g., on a single device, multiple devices, in the cloud as a service. Any of the components, e.g., the pre-processor 502, the coding processor 504, and the matching processor 506, may be implemented or used independently of one another.

According to exemplary embodiments of the present invention, the input image 501 is an infrared image, and is captured by an infrared capture device (not shown in FIG. 5), coupled to the iris processor 500. The infrared capture device may be any type of infrared capture device known to those of ordinary skill in the art. In other instances, the input image 501 is a red, green, blue ("RGB") image, or the like. The input image 501 contains an eye with an at least partially visible iris and pupil and the iris processor 500 attempts to match that eye with an iris of an eye image in a local or remote database of eye images. According to exemplary embodiments, irises are matched based on Hamming distances between two coded iris images.

Initially, the input image 501 is processed by the pre-processor 502. The pre-processor 502 segments and normalizes the iris in the input image 501, where input image 501 may have variable iris/pupil and iris/sclera contrast, small eyelid openings, and non-frontal iris presentations. The result of the pre-processor 502 is a modified iris image with clearly delineated iris boundaries and synthesized quasi-frontal presentation. For example, if the iris in the input image 501 is rotated towards the left, right, up or down, the pre-processor 502 will synthesize an iris on the input image 501 as if it was positioned directly frontally. Similarly, a frontally positioned pupil will be synthesized on the skewed or rotated pupil of the input image 501.

The coding processor 504 analyzes and encodes iris information from the iris image generated by the pre-processor 502 at a range of spatial scales so that structural iris information contained in the input image 501 of varying resolution, quality, and state of focus can be robustly represented. The information content of the resulting code will vary depending on the characteristics of input image 501. The code generated by the coding processor 104 representing the input image 501 allows spatial interpolation to facilitate iris code alignment by the matching processor 506.

The output code from the coding processor 504 is coupled to the matching processor 506. The matching processor 106 incorporates constrained active alignment of iris structure information between stored iris images and captured iris codes generated from the input image 501 to compensate for limitations in iris image normalization by the pre-processor 502. The matching processor 506 performs alignment by performing local shifting or warping of the code to match the generated code with a stored iris code template based on estimated residual distortion of the code generated by the coding processor 504. According to some embodiments, a "barrel shift" algorithm is employed to perform the alignment. Accordingly, structural correspondences are registered and the matching processor 506 compares the aligned codes to determine whether a match exists. If a match is found, the matching processor returns matched iris data 508.

The matched iris data 508 may be used in many instances, for example, to authorize transactions, for example, financial transactions. The pre-processor 502 may be an application executing on a mobile device, such as a mobile phone, camera, tablet, or the like. The pre-processor 502 on the mobile device may capture an image of a user's eye using the camera of the device, perform the pre-processing steps on the mobile device, and then transmit a bundled and encrypted request to the coding processor 504, which may be accessed via a cloud service on a remote server of, for example, a financial institution. In other embodiments, the application on the mobile device may also comprise the coding processor 504 and the iris coding is performed on the mobile device. In some embodiments, the pre-processor 502 may be used in conjunction with an automated teller machine ("ATM"), where a user is authorized via their iris being scanned and processed by the pre-processor 502. The pre-processor 502 may then reside in the software of the ATM, or the ATM may supply the image captured by the camera to a server where the pre-processor 502 is executed for pre-processing.

The coding processor 504 produces an iris code that is transmitted to the matching processor 506. The matching processor 506 may be hosted on a server of a financial institution, or be a remote third party service available to multiple financial institutions for authenticating the user based on their iris image. Once a user is authenticated, financial transactions may be carried out between the user and the financial institutions. Similarly, the iris processor 500 may be used to authenticate a user in any context, such as signing in to a social network, a messaging service or the like.

The iris processor 500 may be used to authorize a cellular device user, determining whether the device is stolen or not, in conjunction with geo-location data, or the like. In this embodiment, upon purchase of a cellular device, the user may "imprint" their identity on the device based on their iris information so that others can be prevented from using the device if reported stolen. Authorization can also be extended to the office or personal environments, where the iris processor 500 may be used to determine whether an authorized or detected user has access to a particular location. For example, in a secure office environment, taking photographs may be prohibited for the majority of employees, but over-riding this prohibition and enabling the camera is available to authorized employees. The employee's mobile device will be used to capture an image of the employee, and the iris processor 500 will match the iris of the employee to extract an employee profile, which delineates the authorizations for this employee.

Figure 6:
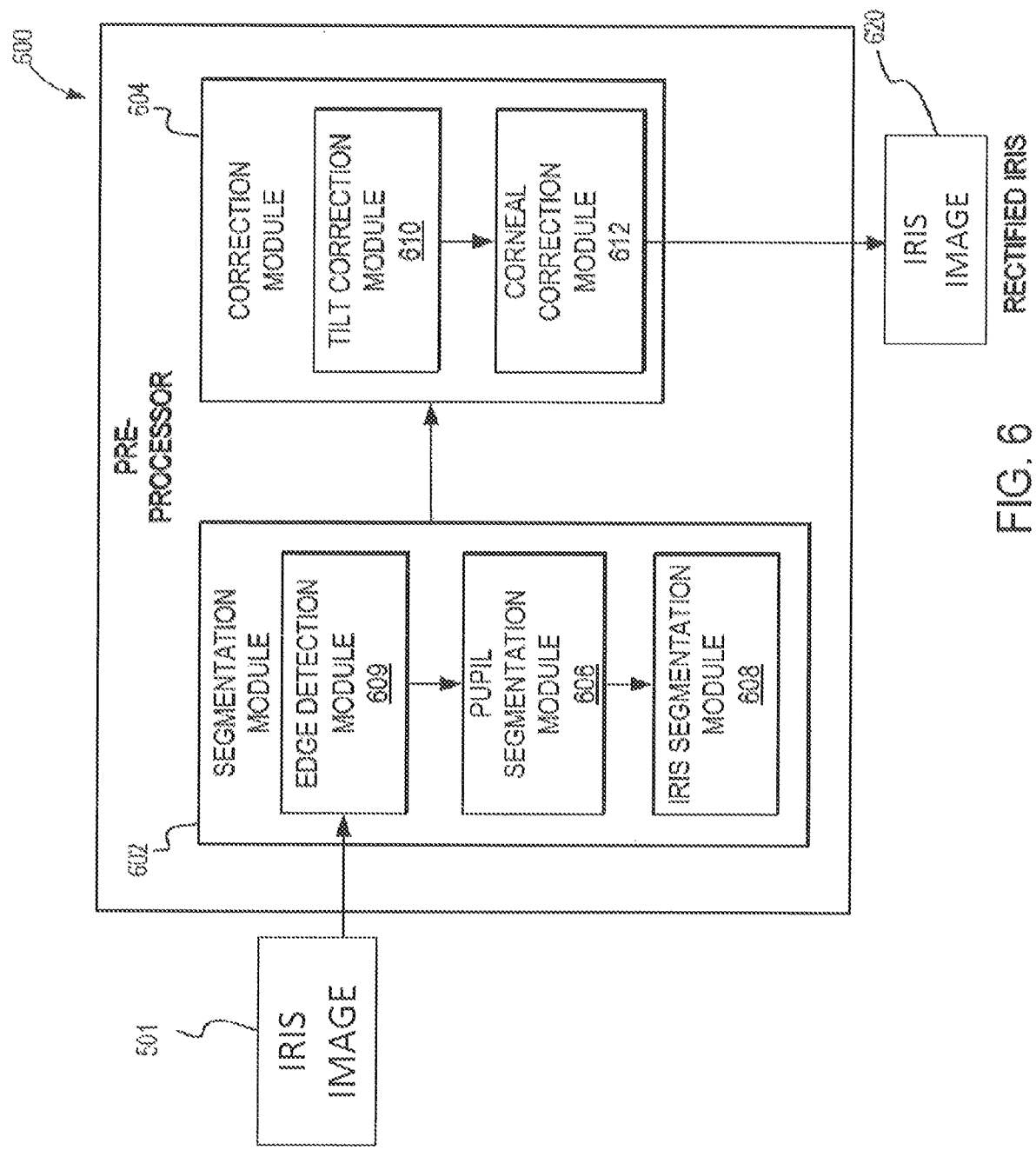
FIG. 6 depicts a simplified block diagram of at least one embodiment of the pre-processor of the iris processor of FIG. 5.

FIG. 6 depicts a block diagram of the pre-processor of the iris processor 500 in accordance with exemplary embodiments of the present invention. The pre-processor receives the input image 501 and outputs a rectified iris image 620. An actual input image 501 and an actual rectified iris image 620 are omitted from FIG. 6 for privacy reasons. The rectified iris image 620 corrects for uncontrolled capture scenarios such as ambient illumination conditions, varied illumination geometries, reduced eyelid opening area, presentation angle (obliquity), or the like. The rectified iris image 620 corrects for various nonconformities.

The pre-processor 600 comprises a segmentation module 602 and a correction module 604. The segmentation module 602 further comprises a pupil segmentation module 606, an iris segmentation module 608 and an edge detection module 609. The segmentation module 602 corrects an input image for low-contrast pupil and iris boundaries. The image produced by the segmentation module 602 is then coupled to the correction module 604 for further correction. The correction module 604 comprises a tilt correction module 610 and a corneal correction module 612.

The segmentation module 602 and the correction module 604 may be used, for example, in the medical field, in targeted marketing, customer tracking in a store, or the like. For example, pupil and iris insertion may be performed by the pre-processor 602, in the medical field as a diagnostic tool for diagnosing diseases that a person might have based on their iris profiles.

Figure 7:
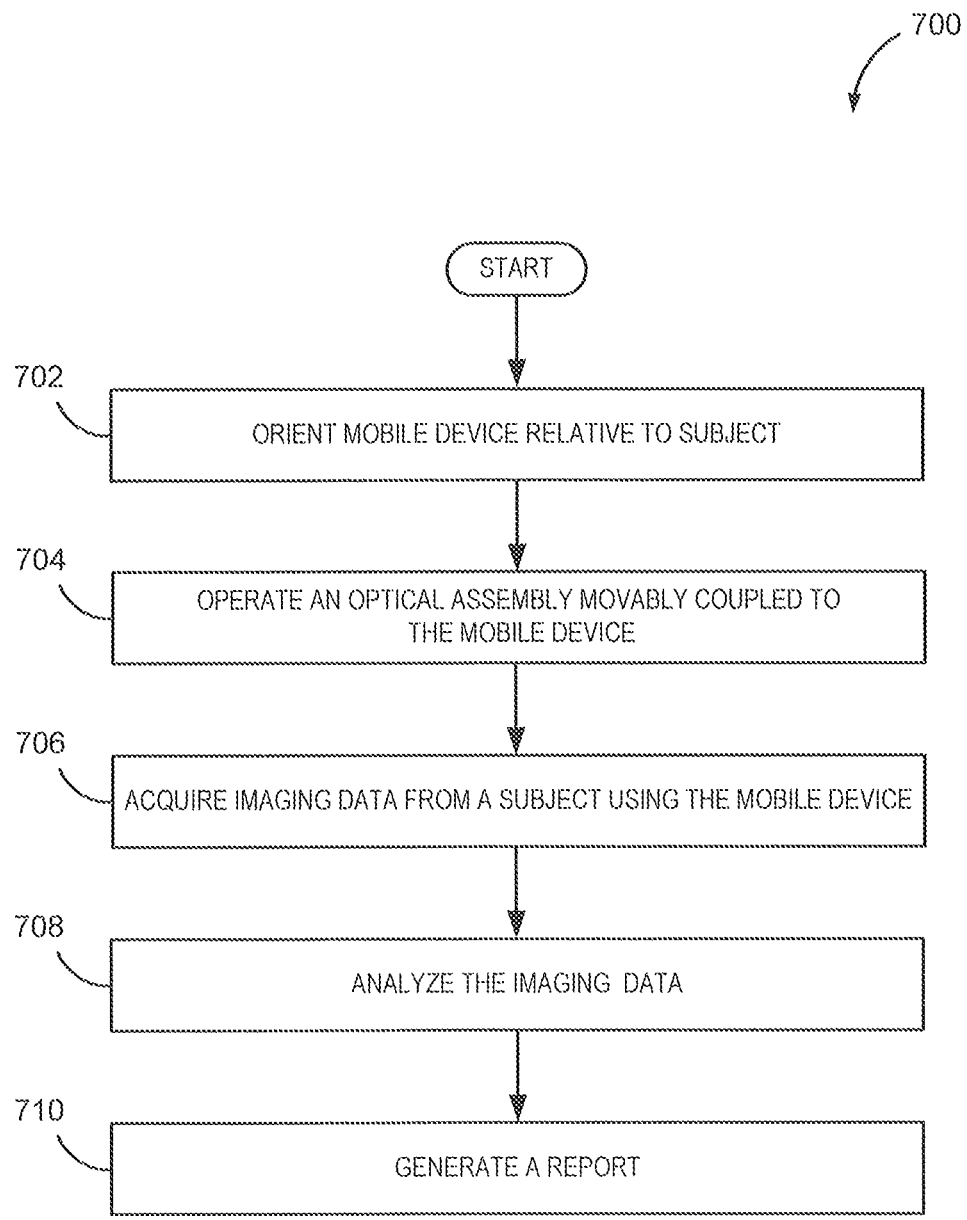
FIG. 7 is a flowchart setting forth steps of a process in accordance with aspects of the present disclosure.

Turning to FIG. 7, steps of a process 700 in accordance with aspects of the present disclosure are provided. In some aspects, using systems and devices described herein, the process 700 may be carried out for operating a mobile device to obtain biometric information from a subject. The process 700 can begin at process block 702 by orienting a mobile device relative to a subject. In some aspects, the mobile device may be oriented such that a back portion of the mobile device faces the subject, and a front portion of the mobile device. Specifically, the front portion includes at least a front camera, as well as other components, such as camera illuminators, proximity sensors and the like. Alternatively, or additionally, the mobile device can also include various device components on the rear portion of the device, such as camera and camera illuminator.

Then, at process block 704, an optical assembly that is movably coupled to the mobile device may be operated. That is, the optical assembly may be positioned in an orientation such that optical pathways of components, such as the front camera or front illuminator, for instance, are modified to be oriented in the direction of the subject, thus allowing imaging or illumination of the subject. As described, illumination and imaging, may also be provided by a camera or illuminator fitted on the rear portion of the mobile device.

Then, at process block 706, the mobile device may be operated to acquire imaging data from the subject, for instance using the front camera. Such, imaging data may then be analyzed, in accordance with aspects of the present disclosure, to generate biometric information corresponding to the subject, as indicated by process block 708. For example, imaging data of the subject may be processed and analyzed using an iris recognition process. In some aspects, the generated biometric information may be utilized to identify a subject, thus providing access, or modifying functionality of the device, or other system or apparatus, based on the identified subject. A report, of any form, may then be generated using the biometric information, as indicated by process block 710. For example, the report may include in indication of a successful or unsuccessful subject identification.

ADDITIONAL EXAMPLES

Illustrative examples of the technologies disclosed herein are provided below. An embodiment of the technologies may include any one or more, and any combination of, the examples described below.

In an example 1, a method for operating a device to obtain biometric information from a subject includes orienting a device relative to a subject with a first portion of the device facing the subject, wherein a second portion of the device comprises a camera and the first and second portions are different sides of the device, and operating an optical assembly that is movably coupled to the device, the optical assembly being configured to modify an optical pathway of at least the camera in a direction of the subject. The method also includes acquiring imaging data of the subject using the camera, and analyzing the acquired imaging data to generate biometric information corresponding to the subject. The method further includes generating a report using the biometric information.

An example 2 includes the subject matter of example 1, wherein the method further comprises activating an illuminator located on the second portion of the device.

An example 3 includes the subject matter of any of examples 1 and 2, wherein the illuminator comprises at least one near infrared light source.

An example 4 includes the subject matter of any of examples 1, 2, and 3, wherein the illuminator is configured to produce a pulsing or strobe illumination operation above continuous wave safe eye limits.

An example 5 includes the subject matter of any of examples 1, 2, 3, and 4, wherein the optical assembly comprises one or more passive optical elements.

An example 6 includes the subject matter of any of examples 1, 2, 3, 4, and 5, wherein the method further comprises performing a subject identification using the biometric information.

An example 7 includes the subject matter of any of examples 1, 2, 3, 4, 5, and 6, wherein the subject identification includes comparing the acquired imaging data with a reference.

An example 8 includes the subject matter of any of examples 1, 2, 3, 4, 5, 6, and 7, wherein the method further comprises determining an access based on the subject identification.

An example 9 includes the subject matter of any of examples 1, 2, 3, 4, 5, 6, 7, and 8, wherein the method further comprises receiving a signal from one or more proximity sensors configured on the device identifying a position of the optical assembly relative to the device.

An example 10 includes the subject matter of any of examples 1, 2, 3, 4, 5, 6, 7, 8, and 9, wherein the device is a mobile device.

An example 11 includes the subject matter of any of examples 1, 2, 3, 4, 5, 6, 7, 8, 9, and 10, wherein the first portion is a back portion of the device and the second portion is a front portion of the device and the optical pathway is modified by about 180 degrees.

In an example 12, a holder for a mobile device includes a base attachable to the mobile device, and an optical assembly movably coupled to the base and configured to pivot about an axis relative to the base. The optical assembly one or more passive optical elements configured to modify an optical pathway of at least a camera affixed to a front portion of the mobile device, and a housing at least partially enclosing the one or more passive optical elements.

An example 13 includes the subject matter of example 12, wherein the one or more passive optical elements includes a prism.

An example 14 includes the subject matter of any of examples 12 and 13, wherein the base is attachable along a top portion of the mobile device.

An example 15 includes the subject matter of any of examples 12, 13, and 14, wherein the base is attachable along at least one of a periphery or a peripheral surface of the mobile device.

An example 16 includes the subject matter of any of examples 12, 13, 14, and 15, wherein the optical assembly is configured to bring into contact the one or more passive optical elements and the mobile device.

An example 17 includes the subject matter of any of examples 12, 13, 14, 15, and 16, wherein the holder further comprises a locking mechanism for maintaining the contact.

An example 18 includes the subject matter of any of examples 12, 13, 14, 15, 16, and 17, wherein the housing further includes at least one sensor surface configured for affecting signals generated by one or more proximity sensors configured on the mobile device.

In an example 19, a method for operating a mobile device having a camera includes the steps of orienting a mobile device relative to a subject such that a first portion of the mobile device faces the subject, wherein a second portion of the device comprises a camera, the first and second portions being on opposite sides of the mobile device, operating an optical assembly that is movably coupled to the mobile device, the optical assembly being configured to modify an optical pathway of at least the camera in a direction of the subject, and acquiring imaging data of the subject using the camera.

An example 20 includes the subject matter of example 19, wherein the method further comprises activating an illuminator located on the second portion of the device and the illuminator includes at least one near infrared light source.

GENERAL CONSIDERATIONS

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, blocks, and the like are referred to as such for ease of discussion, and are not intended to imply that any specific implementation details are required. For example, any of the described modules and/or data structures may be combined or divided into sub-modules, sub-processes or other units of computer code or data as may be required by a particular design or implementation. In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure. This disclosure is to be considered as exemplary and not restrictive in character, and all changes and modifications that come within the spirit of the disclosure are desired to be protected.

What is claimed is:

1. A method for operating a device to obtain biometric information from a subject, the method comprising:

orienting a device relative to a subject with a first portion of the device facing the subject, wherein a second portion of the device comprises a camera and an illuminator, the first and second portions being different sides of the device;

operating an optical assembly that is movably coupled to the device by a base, the base comprising a housing rotatable relative to the base, the housing at least partially enclosing the optical assembly, and the optical assembly comprising two passive optical elements separated by a housing surface of the housing, a first passive optical element of the two passive optical elements corresponding with the camera of the device, and a second passive optical element of the two passive optical elements corresponding with the illuminator of the device, each of the first and second passive optical elements including two reflective surfaces, a first reflective surface of the two reflective surfaces angled more steeply than a second reflective surface of the two reflective surfaces, the two reflective surfaces of the first passive optical element configured to modify an optical pathway of the camera in a direction of the subject by about 180 degrees, and the two reflective surfaces of the second passive optical element configured to modify a pathway of the illuminator in a direction of the subject by about 180 degrees;

acquiring imaging data of the subject using the camera; and analyzing the acquired imaging data to generate biometric information corresponding to the subject.

2. The method of claim 1, wherein the method further comprises activating the illuminator located on the second portion of the device.

3. The method of claim 2, wherein the illuminator comprises at least one near infrared light source.

4. The method of claim 2, wherein the illuminator is configured to produce a pulsing or strobe illumination operation above continuous wave safe eye limits.

5. The method of claim 1, wherein the method further comprises performing a subject identification using the biometric information.

6. The method of claim 5, wherein the subject identification includes comparing the acquired imaging data with a reference.

7. The method of claim 5, wherein the method further comprises determining an access based on the subject identification.

8. The method of claim 1, wherein the method further comprises receiving a signal from one or more proximity sensors configured on the device identifying a position of the optical assembly relative to the device.

9. The method of claim 1, wherein the device is a mobile device.

10. A holder for a mobile device, the holder comprising:
a base attachable to the mobile device;
a housing rotatable relative to the base; and an optical assembly movably coupled to the base, configured to pivot about an axis relative to the base, and at least partially enclosed by the housing, the optical assembly comprising:
two passive optical elements separated by a housing surface of the housing, a first passive optical element of the two passive optical elements corresponding with a camera of the mobile device, and a second passive optical element of the two passive optical elements corresponding with an illuminator of the mobile device, each of the first and second passive optical elements including two reflective surfaces, a first reflective surface of the two reflective surfaces angled more steeply than a second reflective surface of the two reflective surfaces, the two reflective surfaces of the first passive optical element configured to modify an optical pathway of the camera affixed to a portion of the mobile device by about 180 degrees, and the two reflective surfaces of the second passive optical element configured to modify a pathway of the illuminator of the mobile device by about 180 degrees; and
a housing at least partially enclosing the single passive optical element.

11. The holder of claim 10, wherein each of the two passive optical elements includes a prism.

12. The holder of claim 10, wherein the base is attachable along a top portion of the mobile device.

13. The holder of claim 10, wherein the base is attachable along at least one of a periphery or a peripheral surface of the mobile device.

14. The holder of claim 10, wherein the optical assembly is configured to independently bring into contact each of the two passive optical elements and the mobile device.

15. The holder of claim 14, wherein the holder further comprises a locking mechanism for maintaining the contact.

16. The holder of claim 10, wherein the housing further includes at least one sensor surface configured for affecting signals generated by one or more proximity sensors configured on the mobile device.

17. The holder of claim 10, wherein the two passive optical elements are rotatable relative to the base along an axis extending transverse to the two passive optical elements.

18. The holder of claim 10, wherein the first passive optical element is rotatable relative to the base such that in a first position the first passive optical element is in contact with the camera of the mobile device, and in a second position the camera of the mobile device is unobstructed by the first passive optical element and the first passive optical element remains rotatably coupled to the base, and wherein the second passive optical element is rotatable relative to the base such that in a first position the second passive optical element is in contact with the illuminator of the mobile device, and in a second position the illuminator of the mobile device is unobstructed by the second passive optical element and the second passive optical element remains rotatably coupled to the base.

19. A method for operating a mobile device having a camera and an illuminator, the method comprising:
orienting a mobile device relative to a subject with a first portion of the mobile device facing the subject, wherein a second portion of the device comprises a camera and an illuminator, the first and second portions being on opposite sides of the mobile device;
operating an optical assembly that is movably coupled to the mobile device by a base, the base comprising a housing rotatable relative to the base, the housing at least partially enclosing the optical assembly, and the optical assembly comprising two passive optical elements separated by a housing surface of the housing, a first passive optical element of the two passive optical elements corresponding with the camera of the device, and a second passive optical element of the two passive optical elements corresponding with the illuminator of the device, each of the first and second passive optical elements including two reflective surfaces, a first reflective surface of the two reflective surfaces angled more steeply than a second reflective surface of the two reflective surfaces, the two reflective surfaces of the first passive optical element configured to modify an optical pathway of the camera in a direction of the subject by about 180 degrees, and the two reflective surfaces of the second passive optical element configured to modify a pathway of the illuminator in a direction of the subject by about 180 degrees; and
acquiring imaging data of the subject using the camera.

20. The method of claim 19, wherein the method further comprises activating the illuminator located on the second portion of the device and the illuminator includes at least one near infrared light source.

* * * * *